(12) United States Patent
Mallik et al.

(10) Patent No.: US 10,485,027 B2
(45) Date of Patent: Nov. 19, 2019

(54) UPLINK SHORT TRANSMISSION TECHNIQUES USING CONTENTION-BASED RADIO FREQUENCY SPECTRUM

(71) Applicant: QUALCOMM Incorporated, San Diego, CA (US)

(72) Inventors: Siddhartha Mallik, San Diego, CA (US); Taesang Yoo, Riverside, CA (US); Jing Sun, San Diego, CA (US); Xiaoxia Zhang, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 15/410,640

(22) Filed: Jan. 19, 2017

(65) Prior Publication Data

US 2017/0223740 A1 Aug. 3, 2017

Related U.S. Application Data

(60) Provisional application No. 62/290,094, filed on Feb. 2, 2016.

(51) Int. Cl.
*H04W 74/08* (2009.01)
*H04W 72/04* (2009.01)
*H04W 72/12* (2009.01)
*H04W 74/02* (2009.01)

(52) U.S. Cl.
CPC ... *H04W 74/0816* (2013.01); *H04W 72/0446* (2013.01); *H04W 72/12* (2013.01); *H04W 74/02* (2013.01); *H04W 74/0808* (2013.01)

(58) Field of Classification Search
None
See application file for complete search history.

(56) References Cited

U.S. PATENT DOCUMENTS

| 2016/0278074 | A1* | 9/2016  | Yang ..................... H04L 1/1812 |
| 2016/0278088 | A1* | 9/2016  | Cheng ..................... H04L 47/27 |
| 2016/0345344 | A1* | 11/2016 | Larsson ............. H04W 72/1289 |
| 2017/0079032 | A1* | 3/2017  | Li .......................... H04W 72/00 |
| 2017/0156161 | A1* | 6/2017  | Kang ................. H04W 74/0808 |
| 2017/0164352 | A1* | 6/2017  | Yang ..................... H04L 5/0053 |
| 2017/0245302 | A1* | 8/2017  | Mukherjee ............ H04W 16/14 |

(Continued)

OTHER PUBLICATIONS

Fujitsu, "Evaluation of Some Sensing Options for UL LBT," 3GPP TSG RAN WG1 Meeting #82bis, R1-155155, Malmo, Sweden, Oct. 5-9, 2015, 4 pgs., XP051039589, 3rd Generation Partnership Project.

(Continued)

*Primary Examiner* — Donald L Mills
(74) *Attorney, Agent, or Firm* — Holland & Hart LLP

(57) ABSTRACT

Uplink short transmissions (ULSTs) may be configured in a wireless communications system to be transmitted in configured uplink resources within a listen-before-talk (LBT) frame or within a ULST window during which a user equipment (UE) may transmit a ULST and during which the base station may monitor for ULSTs. A UE having an amount of data to be transmitted that is less than a threshold value may transmit the data in the ULST, and avoid the need to have the base station allocate separate uplink resources outside of the configured uplink resources or the ULST window.

28 Claims, 17 Drawing Sheets

(56) References Cited

U.S. PATENT DOCUMENTS

2017/0318607 A1* 11/2017 Tiirola .............. H04W 72/0446
2017/0339717 A1* 11/2017 Futaki ................... H04W 16/14

OTHER PUBLICATIONS

Intel Corporation, "Uplink Transmission for LAA," 3GPP TSG RAN WG2 Meeting #90, R2-152214, Fukuoka, Japan, May 25-29, 2015, 5 pgs., XP050973839, 3rd Generation Partnership Project.

Intel Corporation, "UL LBT for Self-Carrier Scheduling," 3GPP TSG RAN WG1 Meeting #82bis, R1-155312, Malmo, Sweden, Oct. 5-9, 2015, 5 pgs., XP051039626, 3rd Generation Partnership Project.

ISA/EP, International Search Report and Written Opinion of the International Searching Authority, Int'l Application No. PCT/US2017/014396, Apr. 28, 2017, European Patent Office, Rijswijk, NL, 16 pgs.

* cited by examiner

US 10,485,027 B2

UPLINK SHORT TRANSMISSION TECHNIQUES USING CONTENTION-BASED RADIO FREQUENCY SPECTRUM

CROSS REFERENCES

The present Application for Patent claims priority to U.S. Provisional Patent Application No. 62/290,094 by Mallik, et al., entitled "UPLINK SHORT TRANSMISSION TECHNIQUES USING CONTENTION-BASED RADIO FREQUENCY SPECTRUM," filed Feb. 2, 2016, and assigned to the assignee hereof, the entirety of which is hereby expressly incorporated by reference herein for any and all purposes.

BACKGROUND

The following relates generally to wireless communication, and more specifically to uplink short transmission (ULST) techniques using a contention-based radio frequency spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Some modes of communication may enable communication between a base station and a UE in a shared radio frequency spectrum band, or in different radio frequency spectrum bands (e.g., in a licensed radio frequency spectrum band and a shared radio frequency spectrum band) of a cellular network. However, in contrast to a carrier in a licensed radio frequency spectrum band, which may be allocated for use by the devices of one public land mobile network (PLMN) and be available to a base station or a UE of the PLMN at predetermined (or all) times, a carrier in a shared radio frequency spectrum band may be available for use by the devices of the PLMN intermittently. This intermittent availability may be a result of contention for access to the carrier of the shared radio frequency spectrum band, between devices of the PLMN, devices of one or more other PLMNs, and/or other devices (e.g., Wi-Fi devices). For some radio frames, a device of a PLMN may win contention for access to a carrier in the shared radio frequency spectrum band, while for other radio frames, the device may not win contention for access to the carrier in the shared radio frequency spectrum band. Devices may contend for access to the shared radio frequency spectrum band using listen-before-talk (LBT) procedures, in which a device may monitor the shared radio frequency spectrum band to confirm that another device is not transmitting using the medium before initiating a transmission.

In some cases, a UE may have uplink data to transmit to a base station, and may transmit a scheduling request (SR) or random access channel (RACH) request to request that uplink resources be allocated to the UE for transmission of the uplink data. Because of the intermittent availability of carriers in a shared radio frequency spectrum band, a UE may have to contend for access to a carrier in the shared radio frequency spectrum band on multiple occasions, first in order to transmit the SR or RACH request, and again to transmit using the resources allocated for transmission of the uplink data. Reducing the need for a base station to allocate uplink transmission resources, and reducing the need for a UE to have to contend for access to a carrier in the shared radio frequency spectrum band may enhance the efficiency of devices that operate using the shared radio frequency spectrum band.

SUMMARY

The present disclosure, for example, relates to wireless communication systems, and more particularly to uplink short transmission (ULST) techniques using a contention-based radio frequency spectrum. As previously indicated, in some cases it may be desirable to reduce the need for a base station to allocate uplink transmission resources, as well as to reduce the need for a user equipment (UE) to have to contend for access to a carrier in a shared radio frequency spectrum band. Various aspects of the present disclosure provide techniques for identifying ULSTs in which relatively small amounts of data from a UE may be transmitted to a base station directly following the UE winning contention to a carrier in the shared radio frequency spectrum band.

In some aspects of the disclosure, a base station may configure uplink resources within a listen-before-talk (LBT) frame for ULSTs from one or more UEs. A UE having an amount of data to be transmitted that is less than a threshold value may transmit the data in the ULST, and avoid the need to have the base station allocate separate uplink resources for the transmission. The base station also may configure a ULST window during which a UE may transmit a ULST and during which the base station may monitor for ULSTs. In some examples, the ULST window may be configured such that ULSTs are not transmitted by a UE during an LBT frame. In some cases, the base station may configure a UE with a timer, and the UE may start the timer and monitor for downlink transmissions in response to data arriving at the UE for uplink transmission until the timer expires. In some cases, a downlink transmission may include a downlink preamble that may be used to determine uplink resources for transmission of the ULST within an associated LBT frame. In other cases, a UE may not detect a downlink preamble prior to expiry of the timer, in which case a UE may initiate an LBT procedure for the ULST during a configured ULST window.

A method of wireless communication is described. The method may include identifying data to be transmitted to a base station, monitoring for one or more downlink transmissions from the base station, determining, based at least in part on detecting one or more downlink transmissions from the base station, scheduled uplink resources for an uplink transmission associated with the identified data, and initiating an LBT procedure for the uplink transmission associated with the identified data during a ULST window in an absence of detecting one or more downlink transmissions from the base station within a specified time period.

An apparatus for wireless communication is described. The apparatus may include means for identifying data to be transmitted to a base station, means for monitoring for one or more downlink transmissions from the base station, means for determining, based at least in part on detecting one or more downlink transmissions from the base station, scheduled uplink resources for an uplink transmission associated with the identified data, and means for initiating an LBT procedure for the uplink transmission associated with the identified data during a ULST window in an absence of detecting one or more downlink transmissions from the base station within a specified time period.

A further apparatus is described. The apparatus may include a processor, memory in electronic communication with the processor, and instructions stored in the memory. The instructions may be operable to cause the processor to identify data to be transmitted to a base station, monitor for one or more downlink transmissions from the base station, determine, based at least in part on detecting one or more downlink transmissions from the base station, scheduled uplink resources for an uplink transmission associated with the identified data, and initiate an LBT procedure for the uplink transmission associated with the identified data during a ULST window in an absence of detecting one or more downlink transmissions from the base station within a specified time period.

A non-transitory computer readable medium for wireless communication is described. The non-transitory computer-readable medium may include instructions to cause a processor to identify data to be transmitted to a base station, monitor for one or more downlink transmissions from the base station, determine, based on detecting one or more downlink transmissions from the base station, scheduled uplink resources for an uplink transmission associated with the identified data and initiate an LBT procedure for the uplink transmission associated with the identified data during a ULST window in an absence of detecting one or more downlink transmissions from the base station within a specified time period.

Some examples of the method, apparatus, or non-transitory computer-readable medium described above may further include processes, features, means, or instructions for initiating a timer upon identifying the data to be transmitted to the base station. Some examples of the method, apparatus, or non-transitory computer-readable medium described above may further include processes, features, means, or instructions for terminating the timer in response to detecting one or more downlink transmissions from the base station, and wherein the LBT procedure is initiated during the ULST window in response to an expiration of the timer.

In some examples of the method, apparatus, or non-transitory computer-readable medium described above, the monitoring for one or more downlink transmissions comprises: monitoring for a downlink preamble associated with an LBT frame. In some examples of the method, apparatus, or non-transitory computer-readable medium described above, the scheduled uplink resources are determined based on the downlink preamble.

In some examples of the method, apparatus, or non-transitory computer-readable medium described above, the scheduled uplink resources comprise resources of an uplink subframe associated with the LBT frame. In some examples of the method, apparatus, or non-transitory computer-readable medium described above, the scheduled uplink resources comprise one or more of semi-statically configured uplink resources of one or more uplink subframes of the LBT frame, predefined uplink resources of a first uplink subframe of the LBT frame, or dynamically configured resources identified in the downlink preamble.

In some examples of the method, apparatus, or non-transitory computer-readable medium described above, initiating the LBT procedure further comprises: identifying resources within the ULST window for transmitting the uplink transmission associated with the identified data. In some examples of the method, apparatus, or non-transitory computer-readable medium described above, the resources within the ULST window for transmitting the uplink transmission associated with the identified data are semi-statically configured resources.

In some examples of the method, apparatus, or non-transitory computer-readable medium described above, the resources within the ULST window for transmitting the uplink transmission associated with the identified data are received in a system information block (SIB) from the base station. In some examples of the method, apparatus, or non-transitory computer-readable medium described above, the ULST window is outside of an LBT frame.

In some examples of the method, apparatus, or non-transitory computer-readable medium described above, the uplink transmission associated with the identified data comprises a scheduling request (SR) or a random access request to schedule uplink resources for uplink transmission of the identified data.

Some examples of the method, apparatus, or non-transitory computer-readable medium described above may further include processes, features, means, or instructions for determining that the identified data is less than a size threshold. Some examples of the method, apparatus, or non-transitory computer-readable medium described above may further include processes, features, means, or instructions for including the identified data in the uplink transmission associated with the identified data.

A method of wireless communication is described. The method may include transmitting one or more downlink transmissions associated with an LBT frame to at least one UE, configuring a ULST window that is non-overlapping with the LBT frame and monitoring for uplink transmissions from one or more UEs during the ULST window.

An apparatus for wireless communication is described. The apparatus may include means for transmitting one or more downlink transmissions associated with an LBT frame to at least one UE, means for configuring a ULST window that is non-overlapping with the LBT frame and means for monitoring for uplink transmissions from one or more UEs during the ULST window.

A further apparatus is described. The apparatus may include a processor, memory in electronic communication with the processor, and instructions stored in the memory. The instructions may be operable to cause the processor to transmit one or more downlink transmissions associated with an LBT frame to at least one UE, configure a ULST window that is non-overlapping with the LBT frame and monitor for uplink transmissions from one or more UEs during the ULST window.

A non-transitory computer readable medium for wireless communication is described. The non-transitory computer-readable medium may include instructions to cause a processor to transmit one or more downlink transmissions associated with an LBT frame to at least one UE, configure a ULST window that is non-overlapping with the LBT frame and monitor for uplink transmissions from one or more UEs during the ULST window.

Some examples of the method, apparatus, or non-transitory computer-readable medium described above may further include processes, features, means, or instructions for configuring the one or more UEs with a timer for monitoring for the one or more downlink transmissions. Some examples of the method, apparatus, or non-transitory computer-readable medium described above may further include processes, features, means, or instructions for configuring the one or more UEs to initiate the uplink transmissions during the ULST window in an absence of detecting the one or more downlink transmissions prior to expiration of the timer.

Some examples of the method, apparatus, or non-transitory computer-readable medium described above may further include processes, features, means, or instructions for scheduling uplink resources in one or more uplink subframes of the LBT frame. Some examples of the method, apparatus, or non-transitory computer-readable medium described above may further include processes, features, means, or instructions for configuring the one or more UEs to transmit the uplink transmissions during the scheduled uplink resources upon detecting the one or more downlink transmissions prior to expiration of the timer.

In some examples of the method, apparatus, or non-transitory computer-readable medium described above, the one or more downlink transmissions comprise a downlink preamble, and where the scheduled uplink resources are determined based on the downlink preamble. In some examples of the method, apparatus, or non-transitory computer-readable medium described above, the scheduled uplink resources comprise resources of an uplink subframe associated with the LBT frame.

In some examples of the method, apparatus, or non-transitory computer-readable medium described above, the scheduled uplink resources comprise one or more of semi-statically configured uplink resources of one or more uplink subframes of the LBT frame, predefined uplink resources of a first uplink subframe of the LBT frame, or dynamically configured resources identified in a downlink preamble.

In some examples of the method, apparatus, or non-transitory computer-readable medium described above, configuring the ULST window comprises: configuring resources within the ULST window for uplink transmissions. In some examples of the method, apparatus, or non-transitory computer-readable medium described above, the resources within the ULST window for uplink transmissions are semi-statically configured resources.

In some examples of the method, apparatus, or non-transitory computer-readable medium described above, configuring the ULST window further comprises: transmitting a SIB to the one or more UEs with the ULST window and the resources within the ULST window configured for uplink transmissions. In some examples of the method, apparatus, or non-transitory computer-readable medium described above, the uplink transmissions comprise one or more of an SR or a random access request to schedule uplink resources for one or more subsequent uplink transmissions.

Some examples of the method, apparatus, or non-transitory computer-readable medium described above may further include processes, features, means, or instructions for configuring a size threshold for transmitting user data in uplink transmissions during the ULST window.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
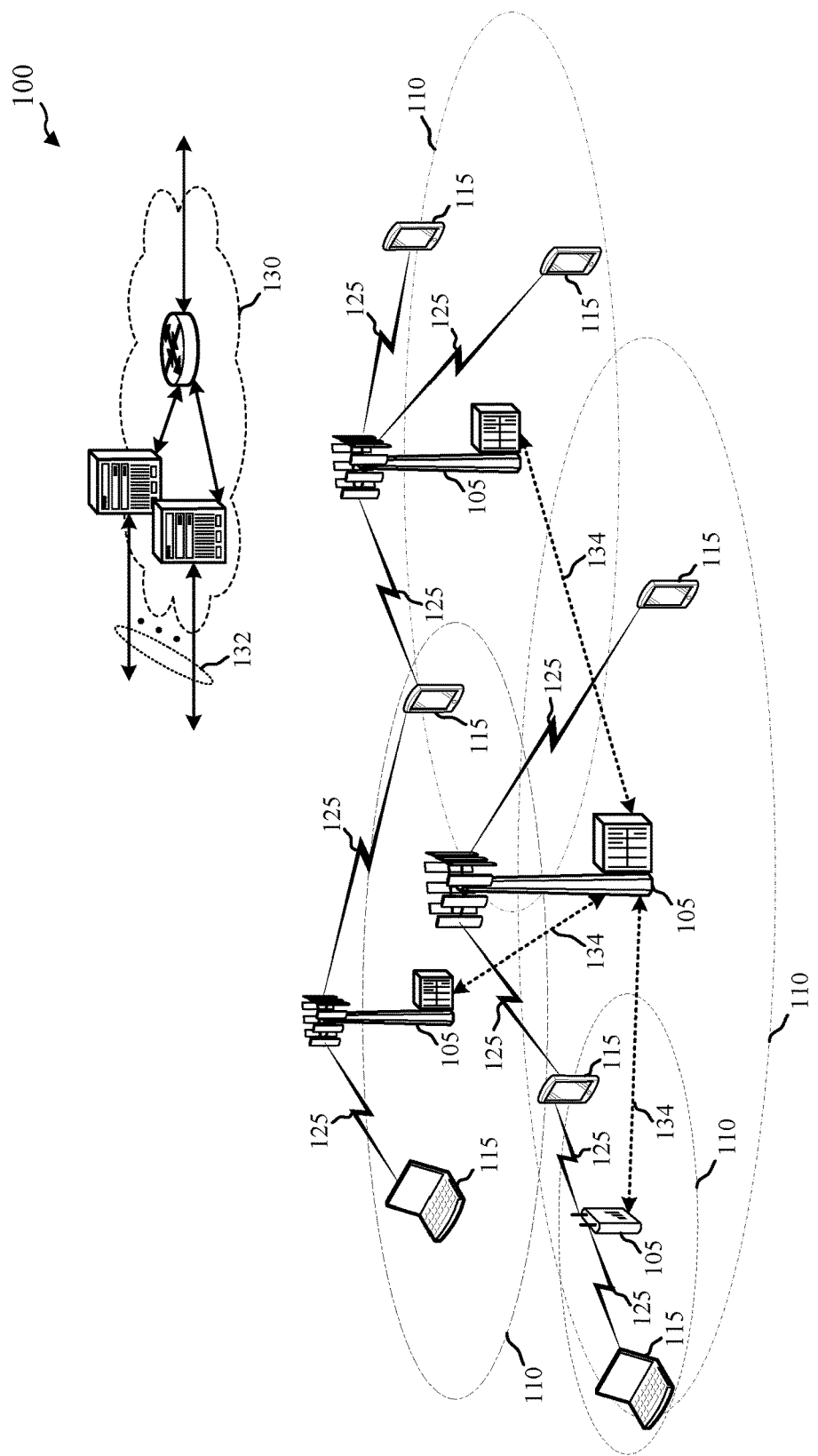
FIG. 1 illustrates an example of a wireless communications system that supports uplink short transmission (ULST) techniques using a contention-based radio frequency spectrum in accordance with aspects of the present disclosure.

Techniques are described in which a shared radio frequency spectrum band may be used for communications over a wireless communication system. In some examples, the shared radio frequency spectrum band may be used for Long Term Evolution (LTE)/LTE-Advanced (LTE-A) communications and may be shared with devices that operate according to different radio access technologies (RATs), such as Wi-Fi devices that operate according to Institute of Electrical and Electronics Engineers (IEEE) 802.11 standards, for example. The shared radio frequency spectrum band may be used in combination with, or independent from, a licensed radio frequency spectrum band. The licensed radio frequency spectrum band may include a radio frequency spectrum band for which transmitting apparatuses may not contend for access (e.g., a radio frequency spectrum band licensed to particular users for particular uses, such as a licensed radio frequency spectrum band usable for LTE/LTE-A communications). The shared radio frequency spectrum band may include a radio frequency spectrum band for which transmitting apparatuses may contend for access using listen-before-talk (LBT) procedures (e.g., a radio frequency spectrum band that is available for unlicensed use, such as Wi-Fi use, a radio frequency spectrum band that is available for use by different RATs, or a radio frequency spectrum band that is available for use by multiple operators in an equally shared or prioritized manner).

In some aspects of the disclosure, a base station may configure uplink resources within an LBT frame for uplink short transmissions (ULSTs) from one or more user equipment (UEs). The base station also may configure an ULST window during which a UE may transmit a ULST and during which the base station may monitor for ULSTs in the event that the UE is not able to transmit the ULST during the configured uplink resources of the LBT frame.

In some examples, ULSTs may be used to transmit relatively small amounts of data from the UE. A UE having an amount of data to be transmitted that is less than a threshold value may transmit the data in the ULST, and avoid the need to have the base station allocate separate uplink resources for the transmission, and may also avoid the need for the UE to contend for access to a carrier of the shared radio frequency spectrum band on multiple occasions to transmit the data. In some examples, ULSTs may be used for scheduling requests (SRs), random access channel (RACH) requests, short data packets having an amount of data that is less than the threshold value, or combinations thereof. In some examples, an extended LBT procedure (e.g., a clear channel assessment (CCA) having a relatively large contention window) may be used prior to or after the ULST to provide other wireless nodes with enhanced likelihood of winning contention for the shared radio frequency spectrum band.

The ULST window may be a configured window within a ULST period. In some examples, a ULST period may be associated with one or more system frame numbers (SFNs) and span a duration of one or more corresponding 10 ms radio frames. In some examples, the ULST window may be configured as a portion of the ULST period, and a ratio of the duration of the ULST window to the periodicity as defined by the ULST period may be the duty cycle of the ULST window. In some examples, ULST duty cycle parameters may be configured by a base station, and may be selected based at least in part on power consumption and potential uplink transmission delays.

In some examples, UEs may be configured such that a ULST window in which the UE may contend for access and transmit a ULST is non-overlapping with an LBT frame. In some cases, the base station may configure a UE with a timer, and the UE may start the timer in response to data arriving at the UE for uplink transmission. The UE may monitor for downlink transmissions until the timer expires. In some cases, a downlink transmission may include a downlink preamble that may be used to determine uplink resources for transmission of the ULST within an associated LBT frame. In other cases, a UE may not detect a downlink preamble prior to expiry of the timer, in which case a UE may initiate an LBT procedure for the ULST during a configured ULST window. The duration of the timer may be selected to provide that the UE will not contend for access to the shared radio frequency spectrum band or transmit a ULST until after completion of an LBT frame in the event that the ULST window starts during an LBT frame.

In some examples, certain uplink resources of an LBT frame may be configured with uplink resources that are available for ULSTs of one or more UEs. The uplink resources within the LBT frame may include, for example, configured resources of a first uplink subframe of the LBT frame. In some cases, one or more downlink subframes of the LBT frame may include a downlink preamble that may be used to determine the allocated uplink resources of the uplink subframe of the LBT frame. In some examples, the duration of the timer configured at a UE may be selected to provide that, if the UE does not detect a downlink preamble, the timer will expire after the last subframe of the LBT frame, and thus the UE is less likely to initiate a transmission that may interfere with the LBT frame.

Aspects of the disclosure are initially described in the context of a wireless communication system that uses a shared radio frequency spectrum band and LBT procedures for accessing the shared radio frequency spectrum band. Aspects of the disclosure are further illustrated by and described with reference to apparatus diagrams, system diagrams, and flowcharts that relate to ULST techniques for wireless transmissions using the shared radio frequency spectrum band.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE/LTE-A network. In some examples, the base stations 105 may configure UEs 115 for ULSTs, and UEs 115 may identify ULST data and transmit ULSTs in allocated uplink resources within an LBT frame or after performing an LBT procedure during a ULST window that is outside of an LBT frame.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, a UE 115 or base station 105 may operate in a shared or unlicensed frequency spectrum. These devices may perform an LBT procedure, such as a CCA, prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence.

In some cases, wireless communications system 100 may utilize one or more enhanced component carriers (eCCs). An eCC may be a non-backward compatible carrier characterized by shorter symbol duration, larger subcarrier spacing, and wider bandwidth than the LTE/LTE-A carriers. An eCC may use different physical layer channel and signal structures, different waveforms, and different medium access control (MAC) procedures compared to LTE/LTE-A. In particular, data transmission on eCC may span multiple time resources (transmission time intervals (TTIs) or subframes) and/or multiple frequency resources (channels). An eCC may use time division duplexing (TDD) and be deployed in a shared radio frequency spectrum band (e.g., where more than one operator may use the spectrum). In some cases, an eCC may be associated with a carrier aggregation (CA) configuration or a dual connectivity configuration (e.g., when multiple serving cells have a suboptimal backhaul link).

In some aspects of the disclosure, a base station may configure uplink resources within an LBT frame for ULSTs from one or more UEs. The base station also may configure a ULST window during which a UE may transmit a ULST and during which the base station may monitor for ULSTs in the event that the UE is not able to transmit the ULST during the configured uplink resources of the LBT frame.

Figure 2:
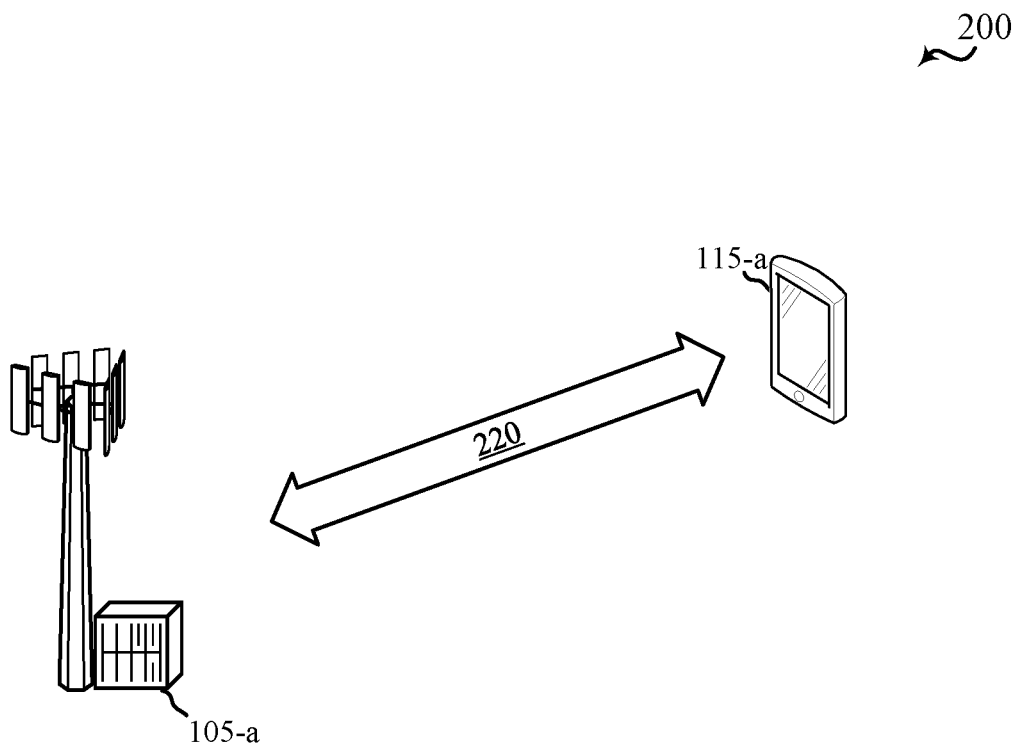
FIG. 2 illustrates an example of a wireless communications system that supports ULST techniques using a contention-based radio frequency spectrum in accordance with aspects of the present disclosure.

FIG. 2 illustrates an example of a wireless communications system 200 that supports ULST techniques using a contention-based radio frequency spectrum in accordance with aspects of the present disclosure. Wireless communications system 200 may include base station 105-a and UE 115-a, which may be examples of the corresponding devices described with reference to FIG. 1.

In some examples of the wireless communication system 200, base station 105-a and UE 115-a may communicate using communications link 220, which may provide for both uplink and downlink communications. The communications link 220, in some examples, may transmit waveforms between base station 105-a and the UE 115-a using one or more component carriers that may include orthogonal frequency division multiple access (OFDMA) waveforms, single carrier frequency division multiple access (SC-FDMA) waveforms, or resource block interleaved frequency division multiple access (FDMA) waveforms, for example. The communications link 220 may be associated with a frequency in the shared radio frequency spectrum band. This example is presented for illustrative purposes and there may be other similar modes of operation or deployment scenarios that provide LTE/LTE-A communication in a shared radio frequency spectrum band. In some examples, base station 105-a may be deployed in a residential, small business, medium business, or enterprise environment, and may allow UE 115-a to establish connections using shared radio frequency spectrum band(s). Such a deployment may allow UE 115-a to operate using shared radio frequency spectrum bands and reduce data usage provided to UE 115-a through licensed radio frequency spectrum bands, which may help reduce costs for a user of UE 115-a in some cases. In some examples, base station 105-a may include hardware for both licensed spectrum access as well as shared spectrum access.

As discussed above, when using a shared radio frequency spectrum, base station 105-a and UE 115-a may perform LBT procedures to determine that the one or more resources (e.g., time resources, frequency resources, or combinations thereof) are available for transmission in the shared radio frequency spectrum band. As also discussed above, in some cases it may be desirable to reduce the need for a base station to allocate uplink transmission resources, as well as to reduce the need for UE 115-a to have to contend for access to a carrier in the shared radio frequency spectrum band. Various aspects of the present disclosure provide techniques for identifying ULSTs in which relatively small amounts of data from UE 115-a may be transmitted to base station 105-a directly following UE 115-a winning contention to a carrier in the shared radio frequency spectrum band.

For example, if UE 115-a has an amount of data to be transmitted that is less than a threshold value, all of the data may be transmitted in the ULST, thus avoiding the need to have base station 105-a allocate separate uplink resources for the transmission, and may also avoid the need for UE 115-a to contend for access to a carrier of the shared radio frequency spectrum band on multiple occasions. In some examples, ULSTs may be used for SRs, RACH requests, short data packets having an amount of data that is less than the threshold value, or combinations thereof. In some examples, an extended LBT procedure (e.g., a CCA having a relatively large contention window) may be used prior to or after the ULST to provide other wireless nodes with enhanced likelihood of winning contention for the shared radio frequency spectrum band.

Figure 3:
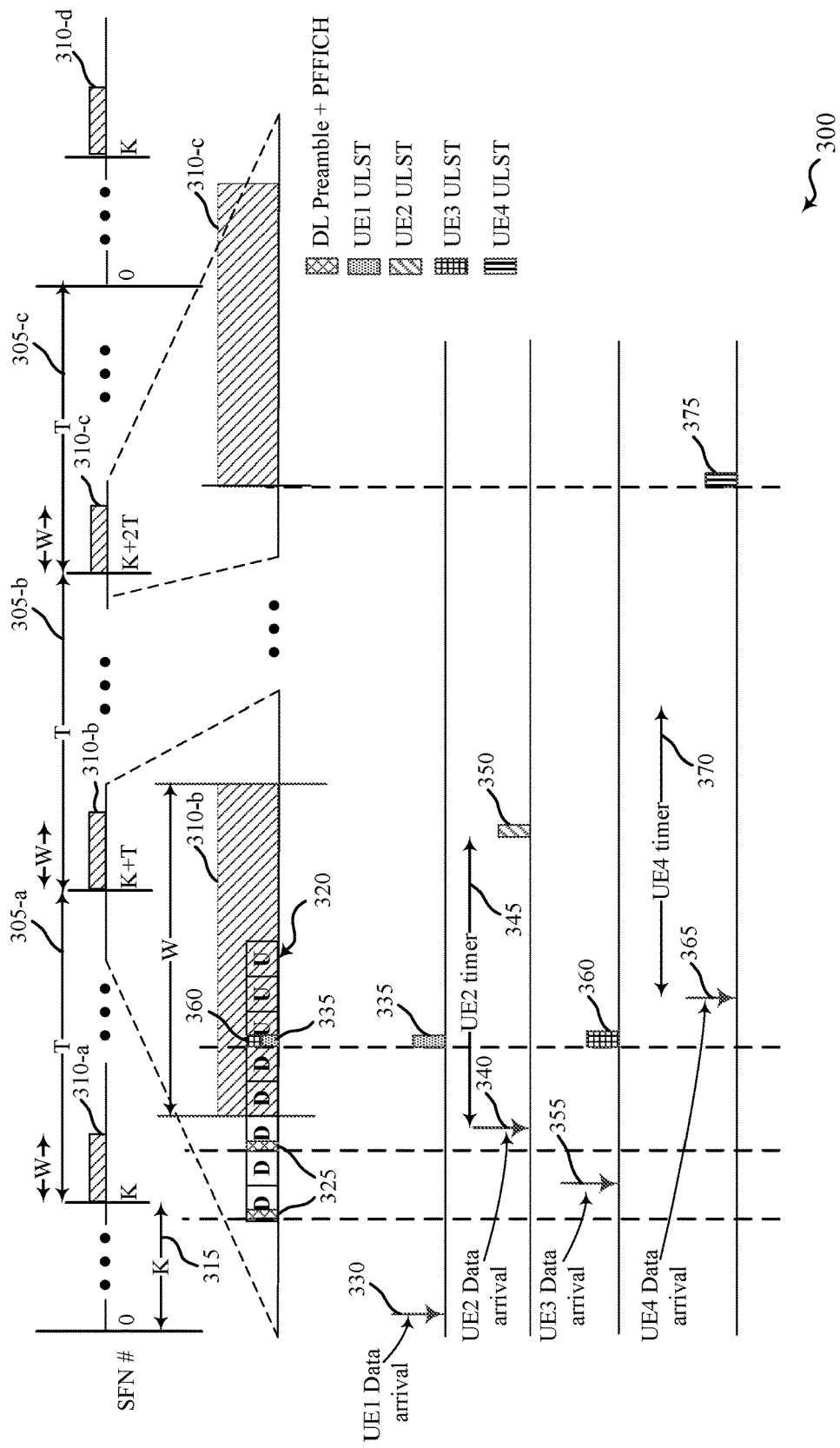
FIG. 3 illustrates an example of ULST periods, ULST windows, and configured uplink ULST resources of LBT frames that support ULST techniques using a contention-based radio frequency spectrum in accordance with aspects of the present disclosure.

FIG. 3 illustrates an example 300 of ULST periods, ULST windows and configured ULST uplink resources of LBT frames that support ULST techniques using a contention-based radio frequency spectrum in accordance with aspects of the present disclosure. In some cases, the example 300 may represent aspects of techniques performed by a UE 115 or base station 105 as described with reference to FIGS. 1 and 2.

In the example 300 of FIG. 3, a number of ULST periods 305 may be configured by one or more base stations (e.g., base stations 105 of FIGS. 1-2). The ULST periods 305 may, in some examples, be associated with one or more SFNs and span a duration (T) of one or more corresponding 10 ms radio frames. In some examples, a ULST window 310 may be configured as a portion of the ULST period 305 (e.g., a first 10 ms duration of a 40 ms ULST period) and a UE may contend for channel access and transmit a ULST during a ULST window 310. A ULST window 310 may have a duration (W) that is configured by a base station, for example. A base station may monitor for ULSTs during the configured ULST windows 310. First ULST window 310-a may begin at the start of first ULST period 305-a, in the example of FIG. 3, following an offset K 315 from SFN#0. A ratio of the duration (W) of the ULST window 310 to the periodicity as defined by the duration (T) of the ULST period 305 may be the duty cycle (W/T) of the ULST window 310. In some examples, ULST duty cycle parameters may be configured by a base station, and may be selected to trade-off between base station power consumption and potential uplink transmission delays. The ULST duty cycle parameters may be configured, in some examples, via a system information block (SIB) that is periodically transmitted by a base station.

In the example of FIG. 3, a base station may initiate transmissions associated with an LBT frame 320 during first ULST period 305-a, and LBT frame 320 may extend into the beginning of second ULST period 305-b at SFN #K+T. In this example, LBT frame 320 starts prior to the start of second ULST window 310-b. In this example, certain downlink (D) subframes may include a downlink preamble and physical frame format indicator channel (PFFICH) transmission 325. In the example of FIG. 3, the first and third transmitted downlink subframes may include the downlink preamble and PFFICH 325. In some examples, when data arrives at a UE, the UE may initiate a timer and monitor for downlink preamble and PFFICH 325 for the duration of the timer. If a downlink preamble and PFFICH 325 is detected, it may be used to determine subsequent uplink resources of the LBT frame 320 that may be used for the ULST. If a downlink preamble and PFFICH 325 is not detected, the UE may initiate an LBT procedure during one of the ULST windows 310. If the timer expires outside of a ULST window 310, the UE may periodically monitor for downlink transmissions according to configured monitoring parameters, and the UE may initiate an LBT procedure to transmit the ULST at the start of a next ULST window. Therefore, a base station may monitor for ULST transmissions during ULST windows 310 and the configured ULST uplink resources of the LBT frame 320, and may suppress monitoring at other times. In some examples, the configured ULST uplink resources of the LBT frame 320 may be physical uplink control channel (PUCCH) resources that may be semi-statically assigned, and located in a first uplink subframe of LBT radio frame 320. In other examples, the ULST uplink resources of the LBT frame 320 may be dynamically assigned in the downlink preamble and PFFICH 325 transmission, or may be established uplink resources defined in a standard. In some examples, different UEs may be assigned to use different ULST uplink resources of the LBT frame 320, such as different frequency resources within a time slot that may be allocated for ULST uplink resources, which may reduce the likelihood of a collision of ULSTs from multiple UEs.

The example 300 of FIG. 3 includes four different examples of UEs which may have data arrive for transmission at different times. In a first example, a first UE (UE1) may have a data arrival at time 330 just before the start of LBT frame 320. The first UE may initiate its timer to monitor for the downlink preamble and PFFICH 325 transmission, which the first UE may detect and use to determine uplink resources 335 for a ULST for the first UE. In a second example, a second UE (UE2) may have a data arrival at time 340 just after the last downlink preamble and PFFICH 325 transmission of LBT frame 320. The second UE may initiate its UE2 timer 345 to monitor for the downlink preamble and PFFICH 325 transmission, which is not detected in this example, leading to the UE2 timer 345 expiring. In this example, UE2 timer 345 expired during ULST window 310-b, and thus the second UE may initiate an LBT procedure and transmit UE2 ULST 350 if the LBT procedure is successful. As indicated above, the duration of UE2 timer 345 may be selected such that UE2 ULST 350 does not collide with LBT frame 320.

In a third example, a third UE (UE3) may have a data arrival at time 355 just after the start of LBT frame 320. The third UE may initiate its timer to monitor for the downlink preamble and PFFICH 325 transmission, which the third UE may detect and use to determine uplink resources for a third UE ULST 360. As mentioned above, in some examples the first UE and the third UE may be configured to use different frequency resources of the ULST uplink resources which may reduce the likelihood of a collision of the first UE ULST 335 and the third UE ULST 360. In a fourth example, a fourth UE (UE4) may have a data arrival at time 365 during LBT frame 320 but after the last downlink preamble and PFFICH 325 transmission of LBT frame 320. The fourth UE may initiate its UE4 timer 370 to monitor for the downlink preamble and PFFICH 325 transmission, which is not detected in this example, leading to the UE4 timer 370 expiring. In this example, UE4 timer 370 expires after ULST window 310-b closes, and thus the fourth UE may initiate an LBT procedure and transmit UE4 ULST 375 during subsequent ULST window 310-c if the LBT procedure is successful.

Figure 4:
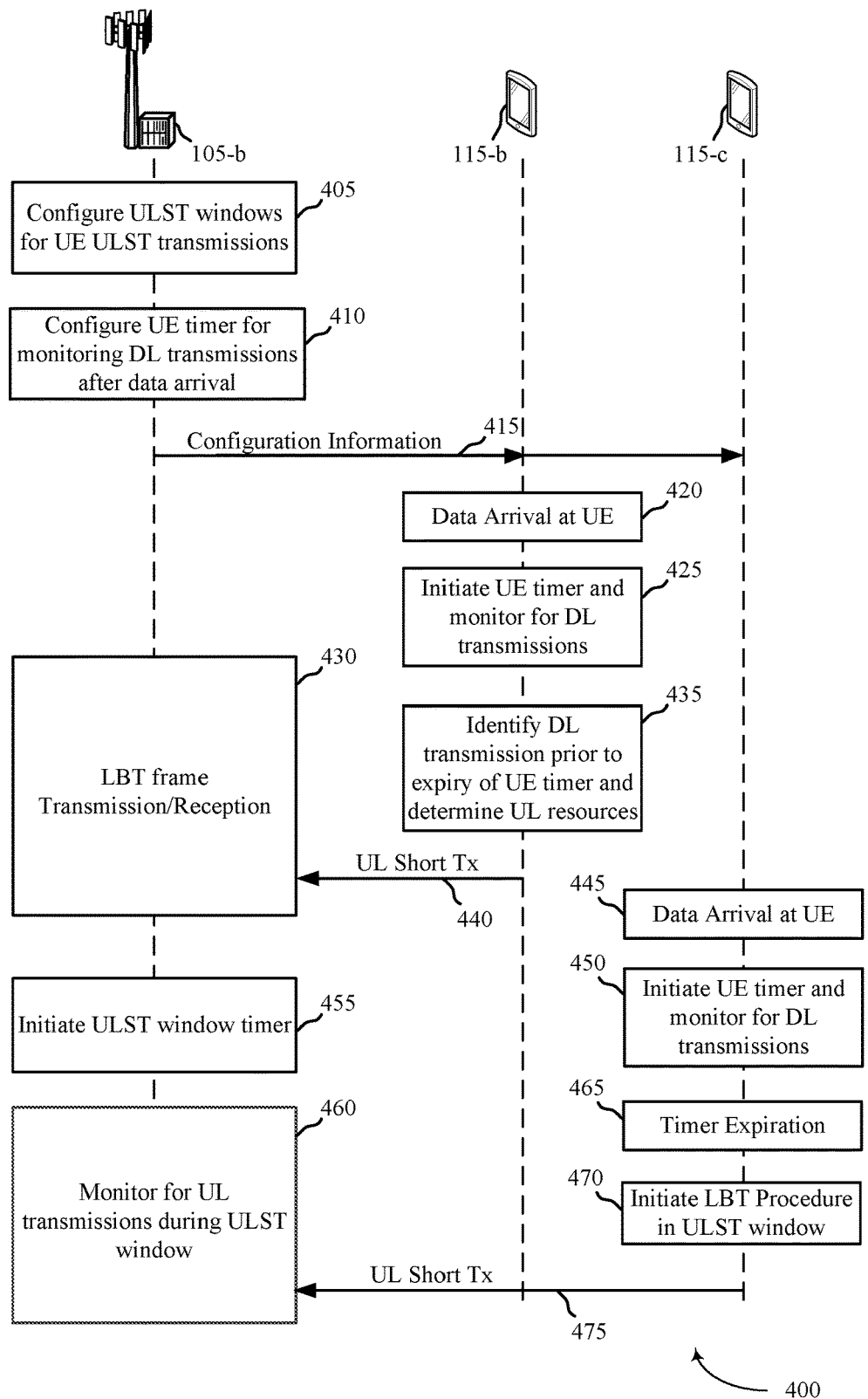
FIG. 4 illustrates an example of a process flow in a system that supports ULST techniques using a contention-based radio frequency spectrum in accordance with aspects of the present disclosure.

FIG. 4 illustrates an example of a process flow 400 for ULST techniques using a contention-based radio frequency spectrum in accordance with various aspects of the present disclosure. Process flow 400 may include base station 105-b, and first UE 115-b and second UE 115-c, which may be examples of the corresponding devices described with reference to FIGS. 1 and 2.

At block 405, base station 105-b may configure ULST periods and windows for UE ULST transmissions. At block 410, base station 105-b may configure a UE timer for monitoring for downlink transmissions after data arrival. The ULST periods and windows, and the UE timer, may be configured as discussed above with respect to FIGS. 2 and 3. Base station 105-b may transmit configuration information 415 to both first UE 115-b and second UE 115-c. Such configuration may be transmitted via control signaling, such as in an SIB or in radio resource control (RRC) signaling, for example. At block 420, data arrives at first UE 115-b. At block 425, first UE 115-b may initiate its UE timer and monitor for downlink transmissions that may include, for example, a downlink preamble, PFFICH, or combinations thereof. Meanwhile during the time period of the UE timer of first UE 115-b, base station 105-b may initiate transmissions/receptions associated with an LBT frame, as indicated at block 430. The LBT frame transmissions/receptions 430 may include downlink preamble and PFFICH transmissions, which may be detected at first UE 115-b prior to the expiration of the UE timer, and which may be used at first UE 115-b, as indicated at block 435. First UE 115-b may thus transmit ULST 440 during allocated uplink resources of LBT frame transmission/reception 430.

In the example of FIG. 4, data may arrive at second UE 115-c at block 445, after base station 105-b transmitted downlink preamble and PFFICH information. At block 450, second UE 115-c may initiate a UE timer and monitor for downlink transmissions which are not detected in this example, leading to timer expiration as indicated at block 465. Second UE 115-c may then, at block 470, initiate an LBT procedure in a ULST window. Base station 105-b, at block 455, may initiate a ULST window timer. At block 460, base station 105-b may monitor for uplink transmissions during the ULST window. Following the LBT procedure at second UE 115-c, a ULST 475 may be transmitted to base station 105-b.

Figure 5:
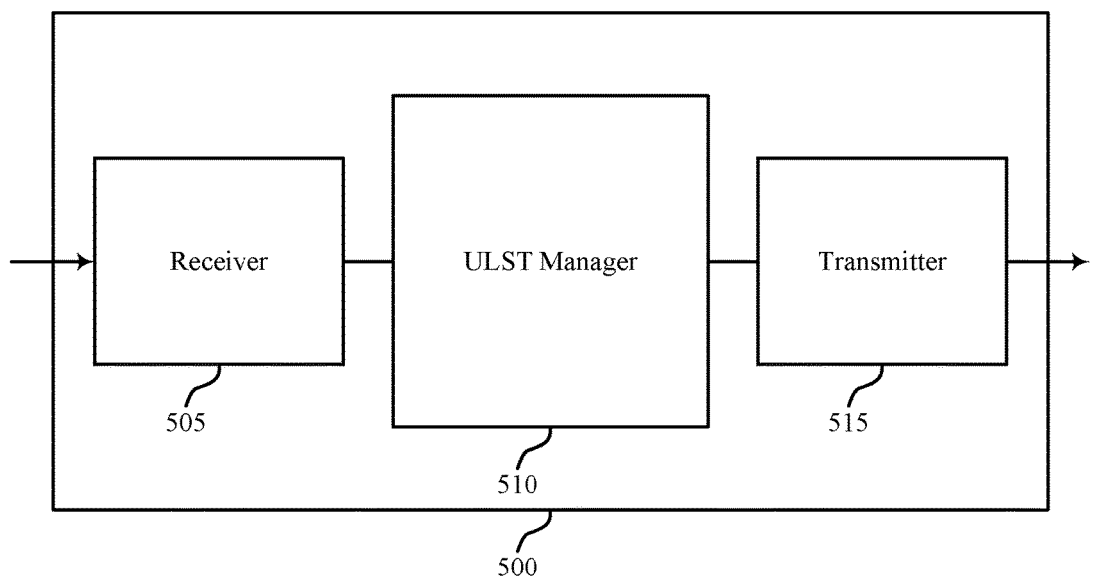
FIGS. 5 through 7 show block diagrams of a wireless device that supports ULST techniques using a contention-based radio frequency spectrum in accordance with aspects of the present disclosure.

FIG. 5 shows a block diagram of a wireless device 500 that supports ULST techniques using a contention-based radio frequency spectrum in accordance with various aspects of the present disclosure. Wireless device 500 may be an example of aspects of a UE 115 described with reference to FIGS. 1, 2, and 4. Wireless device 500 may include receiver 505, ULST manager 510, and transmitter 515. Wireless device 500 may also include a processor. Each of these components may be in communication with each other.

The receiver 505 may receive information such as packets, user data, or control information associated with various information channels (e.g., control channels, data channels, and information related to ULST techniques using the contention-based radio frequency spectrum, etc.). Information may be passed on to other components of the device. The receiver 505 may be an example of aspects of the transceiver 825 described with reference to FIG. 8.

The ULST manager 510 may identify data to be transmitted to a base station, monitor for one or more downlink transmissions from the base station, determine, based on detecting one or more downlink transmissions from the base station, schedule uplink resources for an uplink transmission associated with the identified data, and initiate an LBT procedure for the uplink transmission associated with the identified data during a ULST window in an absence of detecting one or more downlink transmissions from the base station within a specified time period. The ULST manager 510 may also be an example of aspects of the ULST manager 805 described with reference to FIG. 8.

The transmitter 515 may transmit signals received from other components of wireless device 500. In some examples, the transmitter 515 may be collocated with a receiver in a transceiver module. For example, the transmitter 515 may be an example of aspects of the transceiver 825 described with reference to FIG. 8. The transmitter 515 may include a single antenna, or may include a plurality of antennas.

Figure 6:
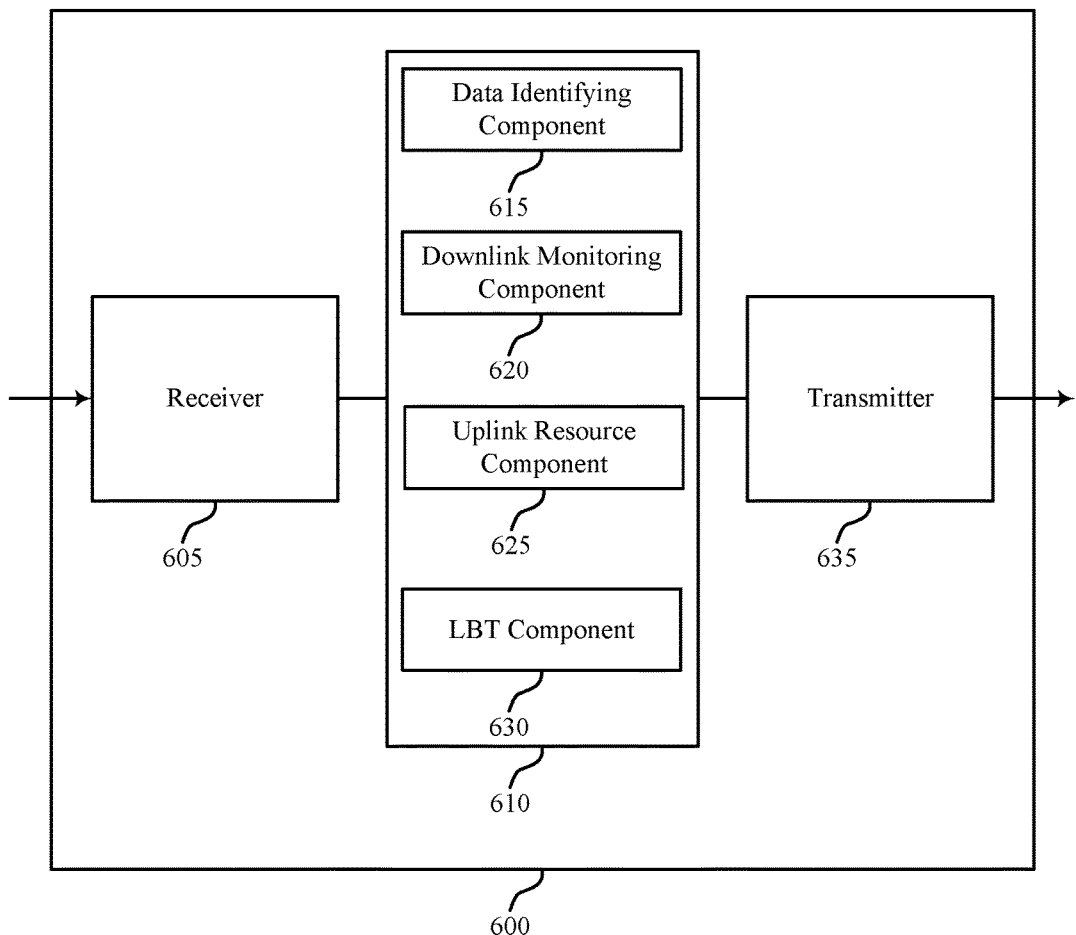

FIG. 6 shows a block diagram of a wireless device 600 that supports ULST techniques using a contention-based radio frequency spectrum in accordance with various aspects of the present disclosure. Wireless device 600 may be an example of aspects of a wireless device 500 or a UE 115 described with reference to FIGS. 1, 2, 4, and 5. Wireless device 600 may include receiver 605, ULST manager 610 and transmitter 635. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The ULST manager 610 may be an example of aspects of ULST manager 505 described with reference to FIG. 5. The ULST manager 610 may include data identifying component 615, downlink monitoring component 620, uplink resource component 625 and LBT component 630. The ULST manager 610 may be an example of aspects of the ULST manager 805 described with reference to FIG. 8.

The data identifying component 615 may identify data to be transmitted to a base station. The downlink monitoring component 620 may monitor for one or more downlink transmissions from the base station. In some cases, the monitoring for one or more downlink transmissions comprises: monitoring for a downlink preamble associated with an LBT frame. In some cases, the scheduled uplink resources are determined based on the downlink preamble. In some cases, the scheduled uplink resources comprise resources of an uplink subframe associated with the LBT frame.

The uplink resource component 625 may determine, based on detecting one or more downlink transmissions from the base station, scheduled uplink resources for an uplink transmission associated with the identified data. In some cases, the scheduled uplink resources comprise one or more of semi-statically configured uplink resources of one or more uplink subframes of the LBT frame, predefined uplink resources of a first uplink subframe of the LBT frame, or dynamically configured resources identified in the downlink preamble. In some cases, the uplink transmission associated with the identified data comprises an SR or a random access request to schedule uplink resources for uplink transmission of the identified data. In some cases, the uplink transmission associated with the identified data comprises relatively short data packets containing user data.

The LBT component 630 may initiate an LBT procedure for the uplink transmission associated with the identified data during a ULST window in an absence of detecting one or more downlink transmissions from the base station within a specified time period. In some cases, initiating the LBT procedure may include identifying resources within the ULST window for transmitting the uplink transmission associated with the identified data. In some cases, the resources within the ULST window for transmitting the uplink transmission associated with the identified data are semi-statically configured resources. In some cases, the resources within the ULST window for transmitting the uplink transmission associated with the identified data are received in a SIB from the base station. In some cases, the ULST window is outside of an LBT frame.

The transmitter 635 may transmit signals received from other components of wireless device 600. In some examples, the transmitter 635 may be collocated with a receiver in a transceiver module. For example, the transmitter 635 may be an example of aspects of the transceiver 825 described with reference to FIG. 8. The transmitter 635 may utilize a single antenna, or may utilize a plurality of antennas.

Figure 7:
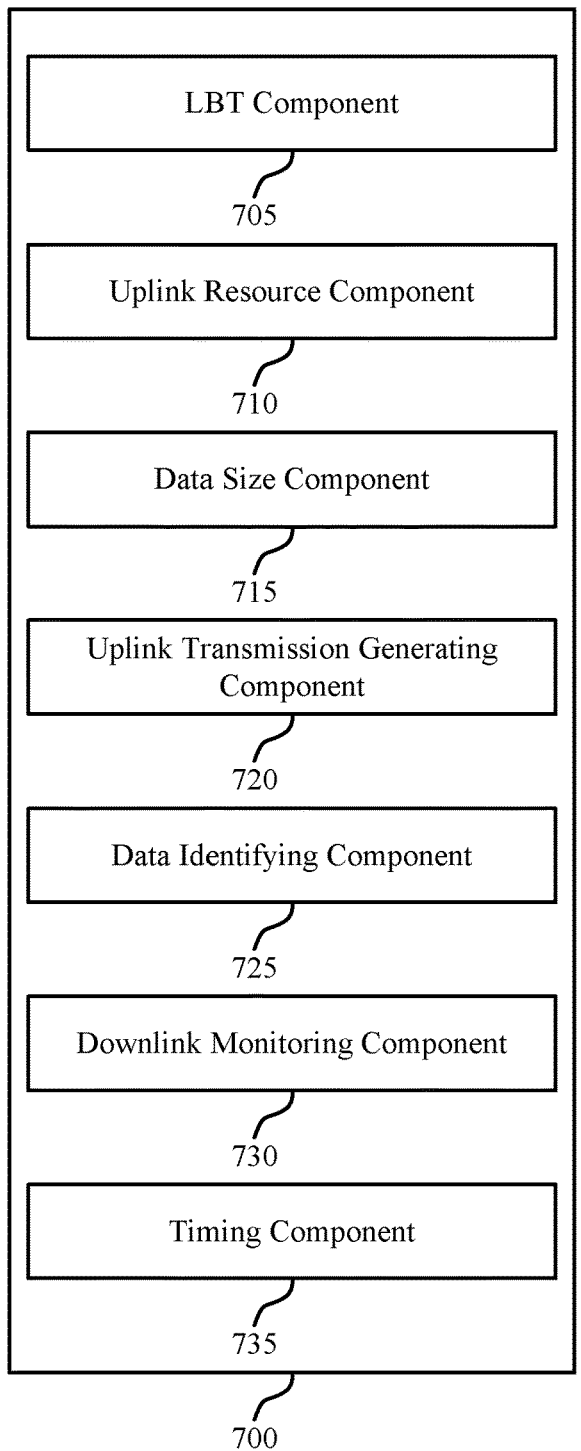

FIG. 7 shows a block diagram of a ULST manager 700 which may be an example of the corresponding component of wireless device 500 or wireless device 600. That is, ULST manager 700 may be an example of aspects of ULST manager 510 or ULST manager 610 described with reference to FIGS. 5 and 6. The ULST manager 700 may also be an example of aspects of the ULST manager 805 described with reference to FIG. 8.

The ULST manager 700 may include LBT component 705, uplink resource component 710, data size component 715, uplink transmission generating component 720, data identifying component 725, downlink monitoring component 730 and timing component 735. Each of these modules may communicate, directly or indirectly, with one another (e.g., via one or more buses).

The LBT component 705 may initiate an LBT procedure for the uplink transmission associated with the identified data during a ULST window in an absence of detecting one or more downlink transmissions from the base station within a specified time period. The uplink resource component 710 may determine, based on detecting one or more downlink transmissions from the base station, scheduled uplink resources for an uplink transmission associated with the identified data.

The data size component 715 may determine that the identified data is less than a size threshold. The uplink transmission generating component 720 may include the identified data in the uplink transmission associated with the identified data. The data identifying component 725 may identify data to be transmitted to a base station. The downlink monitoring component 730 may monitor for one or more downlink transmissions from the base station.

The timing component 735 may initiate a timer upon identifying the data to be transmitted to the base station, and terminate the timer in response to detecting one or more downlink transmissions from the base station. In some cases, an LBT procedure is initiated during the ULST window in response to an expiration of the timer.

Figure 8:
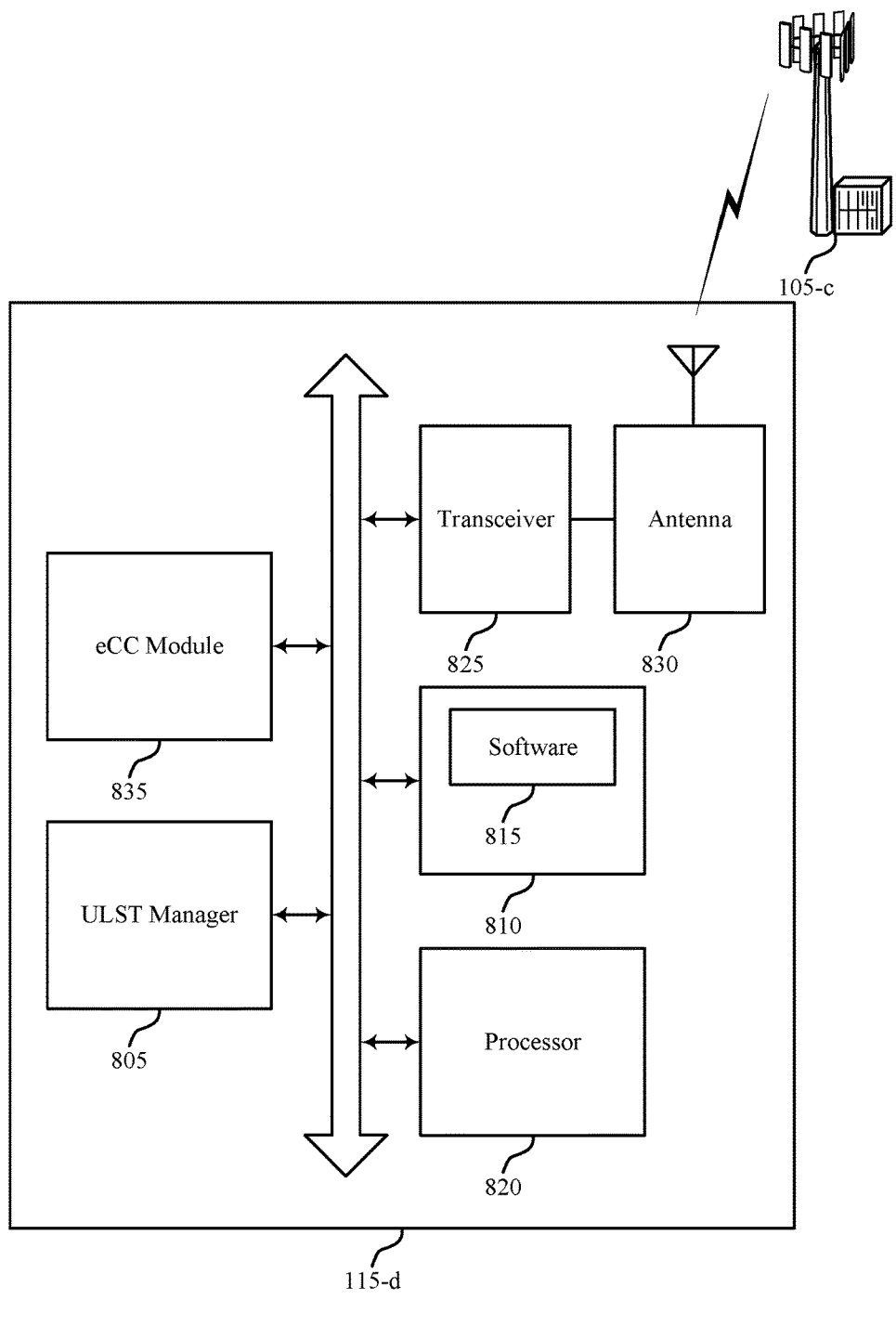
FIG. 8 illustrates a block diagram of a system including a UE that supports ULST techniques using a contention-based radio frequency spectrum in accordance with aspects of the present disclosure.

FIG. 8 shows a diagram of a system 800 including a device that supports ULST techniques using a contention-based radio frequency spectrum in accordance with various aspects of the present disclosure. For example, system 800 may include UE 115-*d*, which may be an example of a wireless device 500, a wireless device 600, or a UE 115 as described with reference to FIGS. 1, 2, and 4 through 7.

UE 115-*d* may also include ULST manager 805, memory 810, processor 820, transceiver 825, antenna 830 and eCC module 835. Each of these modules may communicate, directly or indirectly, with one another (e.g., via one or more buses). The ULST manager 805 may be an example of a ULST manager as described with reference to FIGS. 5-7.

The memory 810 may include random access memory (RAM) and read only memory (ROM). The memory 810 may store computer-readable, computer-executable software including instructions that, when executed, cause the processor to perform various functions described herein (e.g., ULST techniques using the contention-based radio frequency spectrum, etc.). In some cases, the software 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.)

The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

The eCC module 835 may enable operations using eCCs such as communication using shared or unlicensed spectrum, using reduced TTIs or subframe durations, or using a large number of component carriers (CCs).

Figure 9:
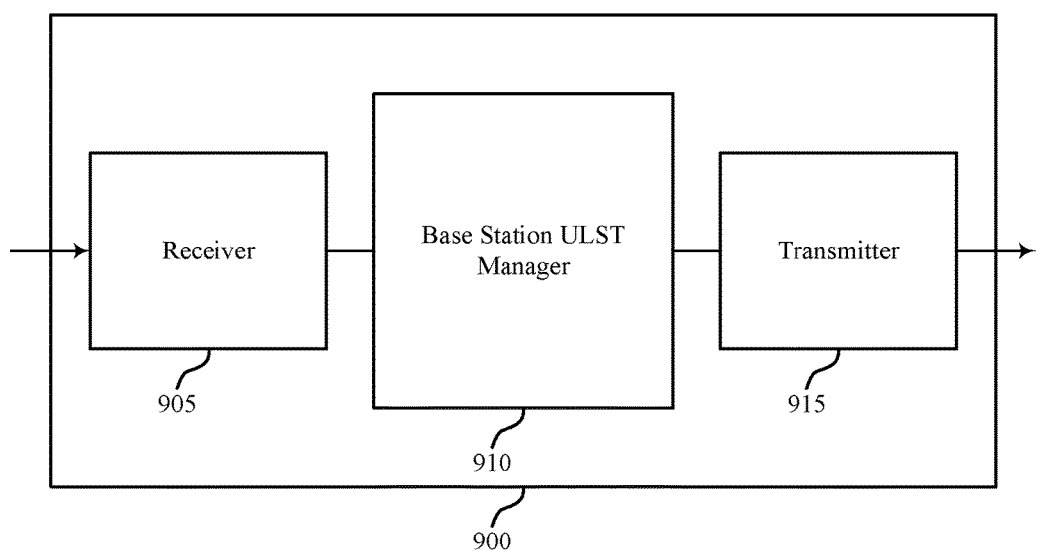
FIGS. 9 through 11 show block diagrams of a wireless device that supports ULST techniques using a contention-based radio frequency spectrum in accordance with aspects of the present disclosure.

FIG. 9 shows a block diagram of a wireless device 900 that supports ULST techniques using a contention-based radio frequency spectrum in accordance with various aspects of the present disclosure. Wireless device 900 may be an example of aspects of a base station 105 described with reference to FIGS. 1, 2, and 4. Wireless device 900 may include receiver 905, base station ULST manager 910 and transmitter 915. Wireless device 900 may also include a processor. Each of these components may be in communication with each other.

The receiver 905 may receive information such as packets, user data, or control information associated with various information channels (e.g., control channels, data channels, and information related to ULST techniques using the contention-based radio frequency spectrum, etc.). Information may be passed on to other components of the device. The receiver 905 may be an example of aspects of the transceiver 1225 described with reference to FIG. 12.

The base station ULST manager 910 may transmit one or more downlink transmissions associated with an LBT frame to at least one UE, configure a ULST window that is non-overlapping with the LBT frame, and monitor for uplink transmissions from one or more UEs during the ULST window. The base station ULST manager 910 may also be an example of aspects of the base station ULST manager 1205 described with reference to FIG. 12.

The transmitter 915 may transmit signals received from other components of wireless device 900. In some examples, the transmitter 915 may be collocated with a receiver in a transceiver module. For example, the transmitter 915 may be an example of aspects of the transceiver 1225 described with reference to FIG. 12. The transmitter 915 may include a single antenna, or may include a plurality of antennas.

Figure 10:
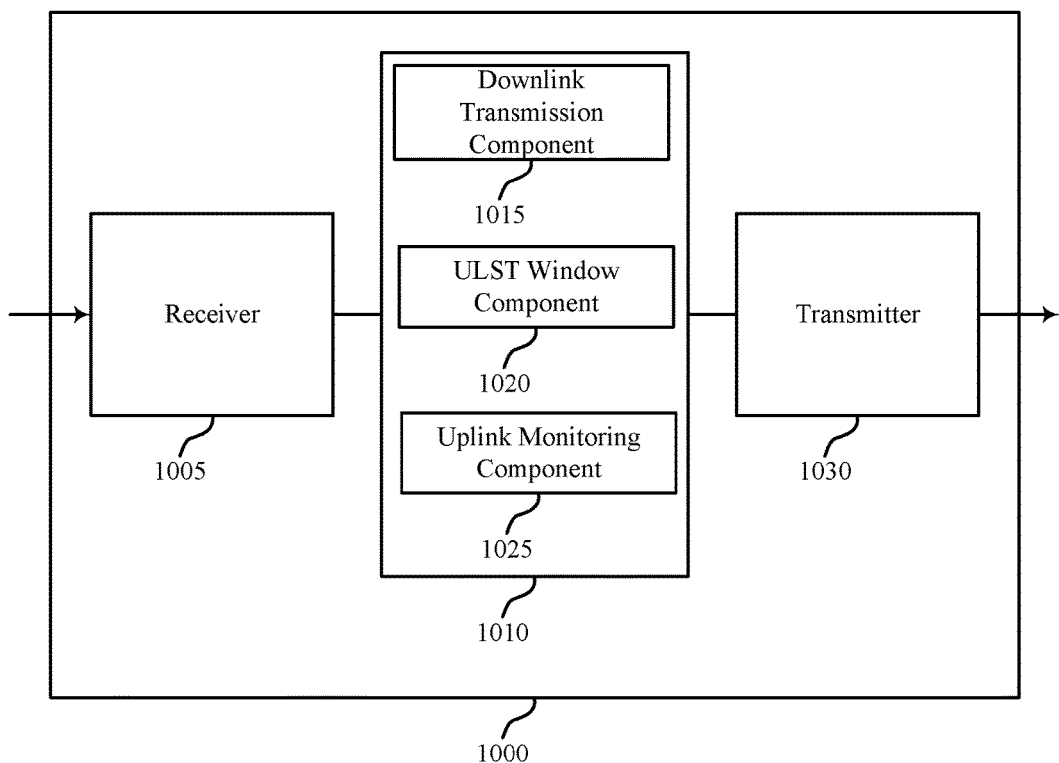

FIG. 10 shows a block diagram of a wireless device 1000 that supports ULST techniques using a contention-based radio frequency spectrum in accordance with various aspects of the present disclosure. Wireless device 1000 may be an example of aspects of a wireless device 900 or a base station 105 described with reference to FIGS. 1, 2, 4, and 9. Wireless device 1000 may include receiver 1005, base station ULST manager 1010 and transmitter 1030. Wireless device 1000 may also include a processor. Each of these components may be in communication with each other.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The base station ULST manager 1010 may be an example of aspects of base station ULST manager 905 described with reference to FIG. 9. The base station ULST manager 1010 may include downlink transmission component 1015, ULST window component 1020 and uplink monitoring component 1025. The base station ULST manager 1010 may be an example of aspects of the base station ULST manager 1205 described with reference to FIG. 12. The downlink transmission component 1015 may transmit one or more downlink transmissions associated with an LBT frame to at least one UE.

The ULST window component 1020 may configure a ULST window that is non-overlapping with the LBT frame. In some cases, configuring the ULST window comprises: configuring resources within the ULST window for uplink transmissions. In some cases, the resources within the ULST window for uplink transmissions are semi-statically configured resources. In some cases, configuring the ULST window further comprises: transmitting an SIB to the one or more UEs with the ULST window and the resources within the ULST window configured for uplink transmissions.

The uplink monitoring component 1025 may monitor for uplink transmissions from one or more UEs during the ULST window. In some cases, the uplink transmissions comprise one or more of an SR, a random access request to schedule uplink resources for one or more subsequent uplink transmissions, a short data packet, or combinations thereof.

The transmitter 1030 may transmit signals received from other components of wireless device 1000. In some examples, the transmitter 1030 may be collocated with a receiver in a transceiver module. For example, the transmitter 1030 may be an example of aspects of the transceiver 1225 described with reference to FIG. 12. The transmitter 1030 may utilize a single antenna, or may utilize a plurality of antennas.

Figure 11:
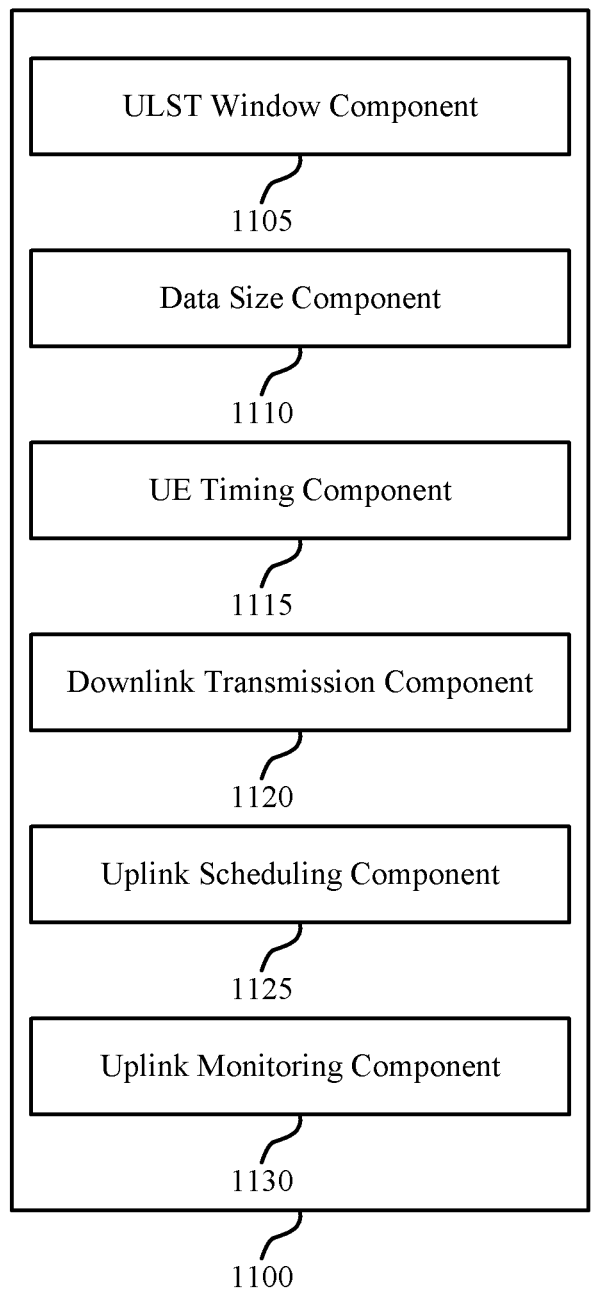

FIG. 11 shows a block diagram of a base station ULST manager 1100 which may be an example of the corresponding component of wireless device 900 or wireless device 1000. That is, base station ULST manager 1100 may be an example of aspects of base station ULST manager 910 or base station ULST manager 1010 described with reference to FIGS. 9 and 10. The base station ULST manager 1100 may also be an example of aspects of the base station ULST manager 1205 described with reference to FIG. 12.

The base station ULST manager 1100 may include ULST window component 1105, data size component 1110, UE timing component 1115, downlink transmission component 1120, uplink scheduling component 1125 and uplink monitoring component 1130. Each of these modules may communicate, directly or indirectly, with one another (e.g., via one or more buses).

The ULST window component 1105 may configure a ULST window that is non-overlapping with the LBT frame. The data size component 1110 may configure a size threshold for transmitting user data in uplink transmissions during the ULST window. The UE timing component 1115 may configure the one or more UEs with a timer for monitoring for the one or more downlink transmissions, and configure the one or more UEs to initiate the uplink transmissions during the ULST window in an absence of detecting the one or more downlink transmissions prior to expiration of the timer.

The downlink transmission component 1120 may transmit one or more downlink transmissions associated with an LBT frame to at least one UE. The uplink scheduling component 1125 may schedule uplink resources in one or more uplink subframes of the LBT frame, and configure the one or more UEs to transmit the uplink transmissions during the scheduled uplink resources upon detecting the one or more downlink transmissions prior to expiration of the timer. In some cases, the one or more downlink transmissions comprise a downlink preamble, and where the scheduled uplink resources are determined based on the downlink preamble. In some cases, the scheduled uplink resources comprise resources of an uplink subframe associated with the LBT frame. In some cases, the scheduled uplink resources comprise one or more of semi-statically configured uplink resources of one or more uplink subframes of the LBT frame, predefined uplink resources of a first uplink subframe of the LBT frame, or dynamically configured resources identified in a downlink preamble.

The uplink monitoring component 1130 may monitor for uplink transmissions from one or more UEs during the ULST window. In some cases, the uplink transmissions comprise one or more of an SR or a random access request to schedule uplink resources for one or more subsequent uplink transmissions.

Figure 12:
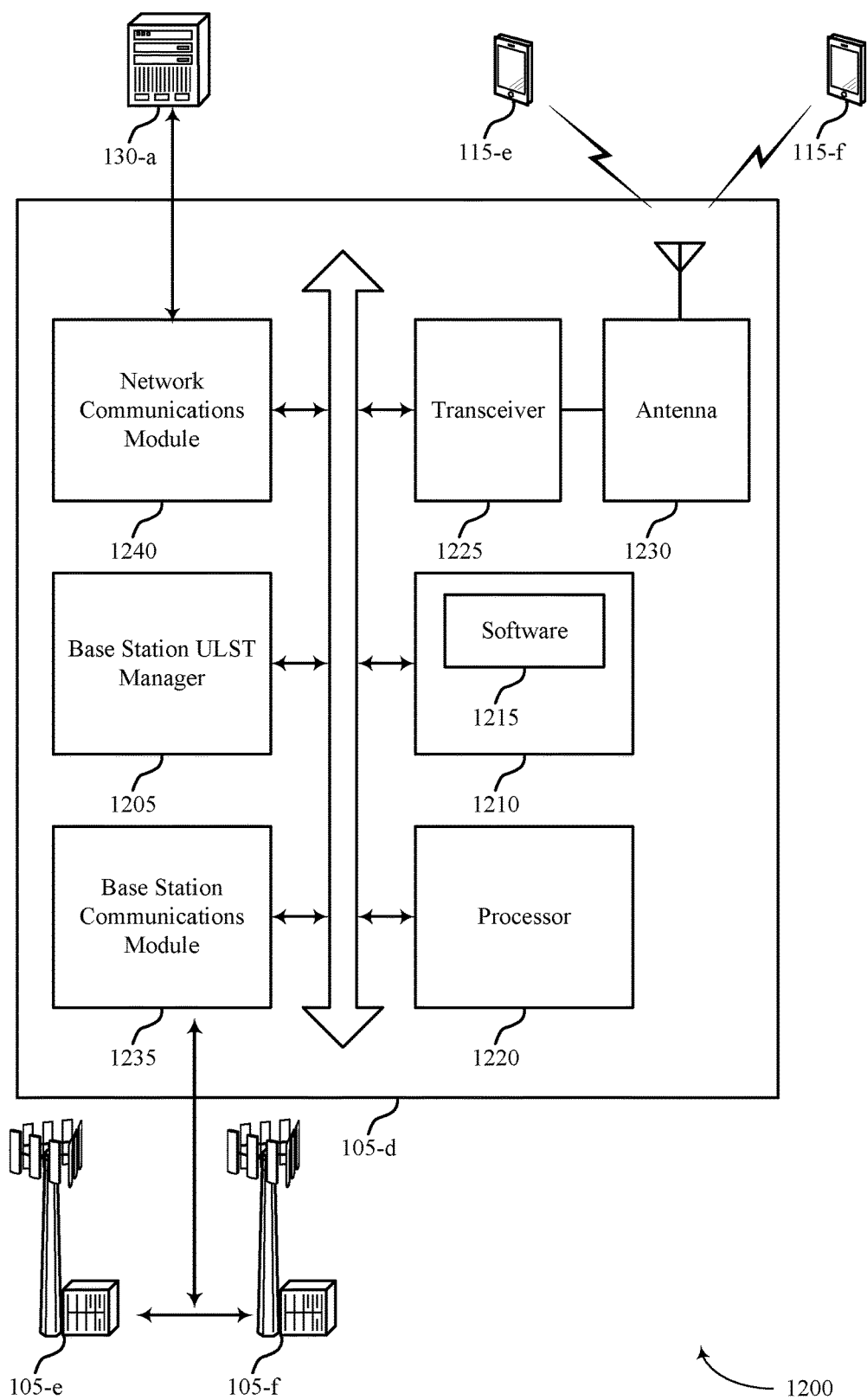
FIG. 12 illustrates a block diagram of a system including a base station that supports ULST techniques using a contention-based radio frequency spectrum in accordance with aspects of the present disclosure.

FIG. 12 shows a diagram of a wireless system 1200 including a device that supports ULST techniques using a contention-based radio frequency spectrum in accordance with various aspects of the present disclosure. For example, system 1200 may include base station 105-d, which may be an example of a wireless device 900, a wireless device 1000, or a base station 105 as described with reference to FIGS. 1, 2, 4, and 9 through 11. Base station 105-d may also include components for bi-directional voice and data communications including components for transmitting communications and components for receiving communications. For example, base station 105-d may communicate bi-directionally with one or more UEs 115.

Base station 105-d may also include base station ULST manager 1205, memory 1210, processor 1220, transceiver 1225, antenna 1230, base station communications module 1235 and network communications module 1240. Each of these modules may communicate, directly or indirectly, with one another (e.g., via one or more buses). The base station ULST manager 1205 may be an example of a base station ULST manager as described with reference to FIGS. 9-11.

The memory 1210 may include RAM and ROM. The memory 1210 may store computer-readable, computer-executable software including instructions that, when executed, cause the processor to perform various functions described herein (e.g., ULST techniques using the contention-based radio frequency spectrum, etc.). In some cases, the software 1215 may not be directly executable by the processor but may cause a computer (e.g., when compiled and executed) to perform functions described herein. The processor 1220 may include an intelligent hardware device, (e.g., a CPU, a microcontroller, an ASIC, etc.)

The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna 1230, which may be capable of concurrently transmitting or receiving multiple wireless transmissions.

The base station communications module 1235 may manage communications with other base station 105, and may include a controller or scheduler for controlling communications with UEs 115 in cooperation with other base stations 105. For example, the base station communications module 1235 may coordinate scheduling for transmissions to UEs 115 for various interference mitigation techniques such as beamforming or joint transmission. In some examples, base station communications module 1235 may provide an X2 interface within an LTE/LTE-A wireless communication network technology to provide communication between base stations 105.

The network communications module 1240 may manage communications with the core network (e.g., via one or more wired backhaul links). For example, the network communications module 1240 may manage the transfer of data communications for client devices, such as one or more UEs 115.

Figure 13:
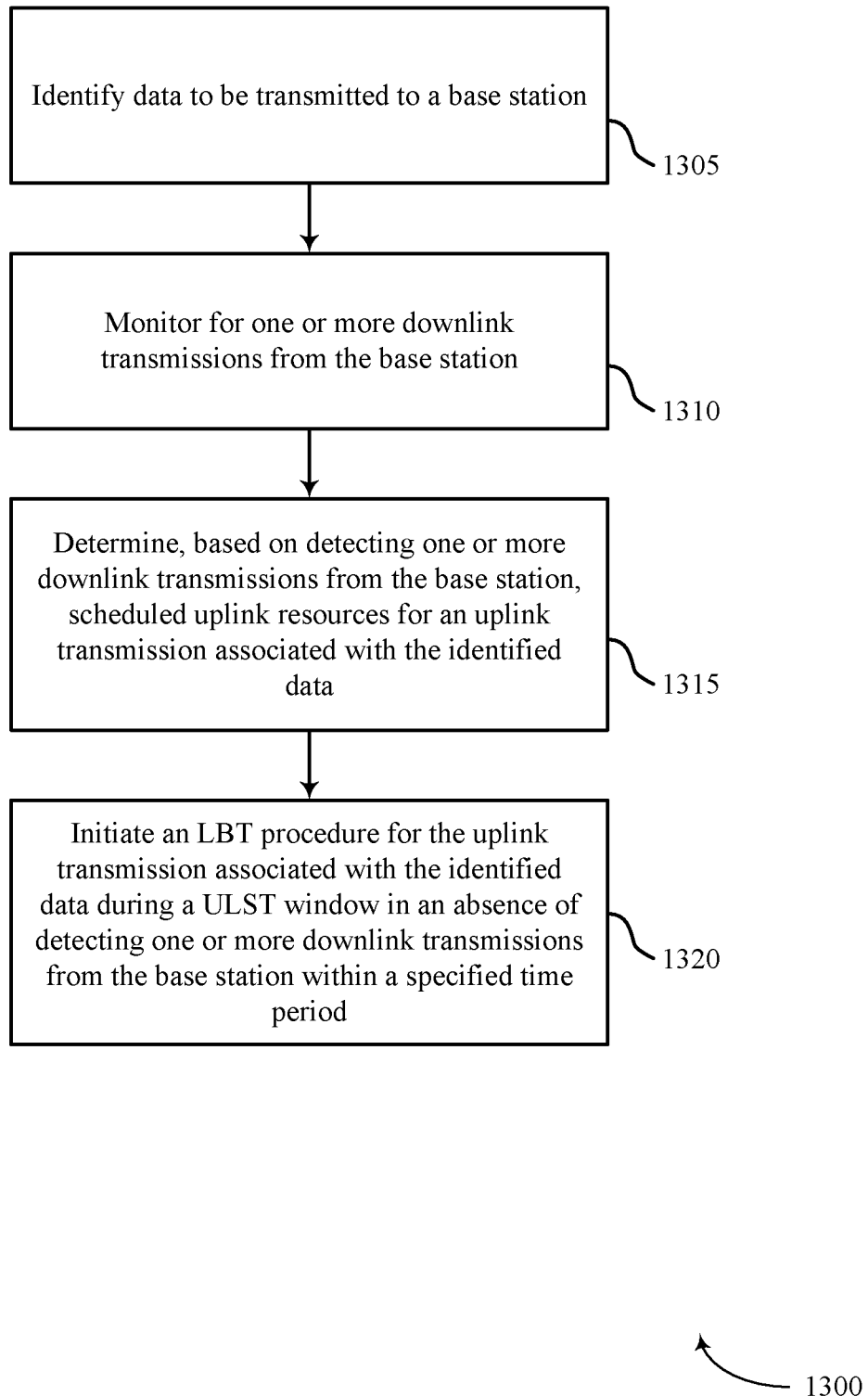
FIGS. 13 through 17 illustrate methods for ULST techniques using a contention-based radio frequency spectrum in accordance with aspects of the present disclosure.

FIG. 13 shows a flowchart illustrating a method 1300 for ULST techniques using a contention-based radio frequency spectrum in accordance with various aspects of the present disclosure. The operations of method 1300 may be implemented by a device such as a UE 115 or its components as described with reference to FIGS. 1, 2 and 4. For example, the operations of method 1300 may be performed by the ULST manager as described herein. In some examples, the UE 115 may execute a set of codes to control the functional elements of the device to perform the functions described below. Additionally or alternatively, the UE 115 may perform aspects of the functions described below using special-purpose hardware.

At block 1305, the UE 115 may identify data to be transmitted to a base station as described above with reference to FIGS. 2-4. In certain examples, the operations of block 1305 may be performed by the data identifying component as described with reference to FIGS. 6 and 7.

At block 1310, the UE 115 may monitor for one or more downlink transmissions from the base station as described above with reference to FIGS. 2-4. In certain examples, the operations of block 1310 may be performed by the downlink monitoring component as described with reference to FIGS. 6 and 7.

At block 1315, the UE 115 may determine, based on detecting one or more downlink transmissions from the base station, scheduled uplink resources for an uplink transmission associated with the identified data as described above with reference to FIGS. 2-4. In certain examples, the operations of block 1315 may be performed by the uplink resource component as described with reference to FIGS. 6 and 7.

At block 1320, the UE 115 may initiate an LBT procedure for the uplink transmission associated with the identified data during a ULST window in an absence of detecting one or more downlink transmissions from the base station within a specified time period as described above with reference to FIGS. 2-4. In certain examples, the operations of block 1320 may be performed by the LBT component as described with reference to FIGS. 6 and 7.

Figure 14:
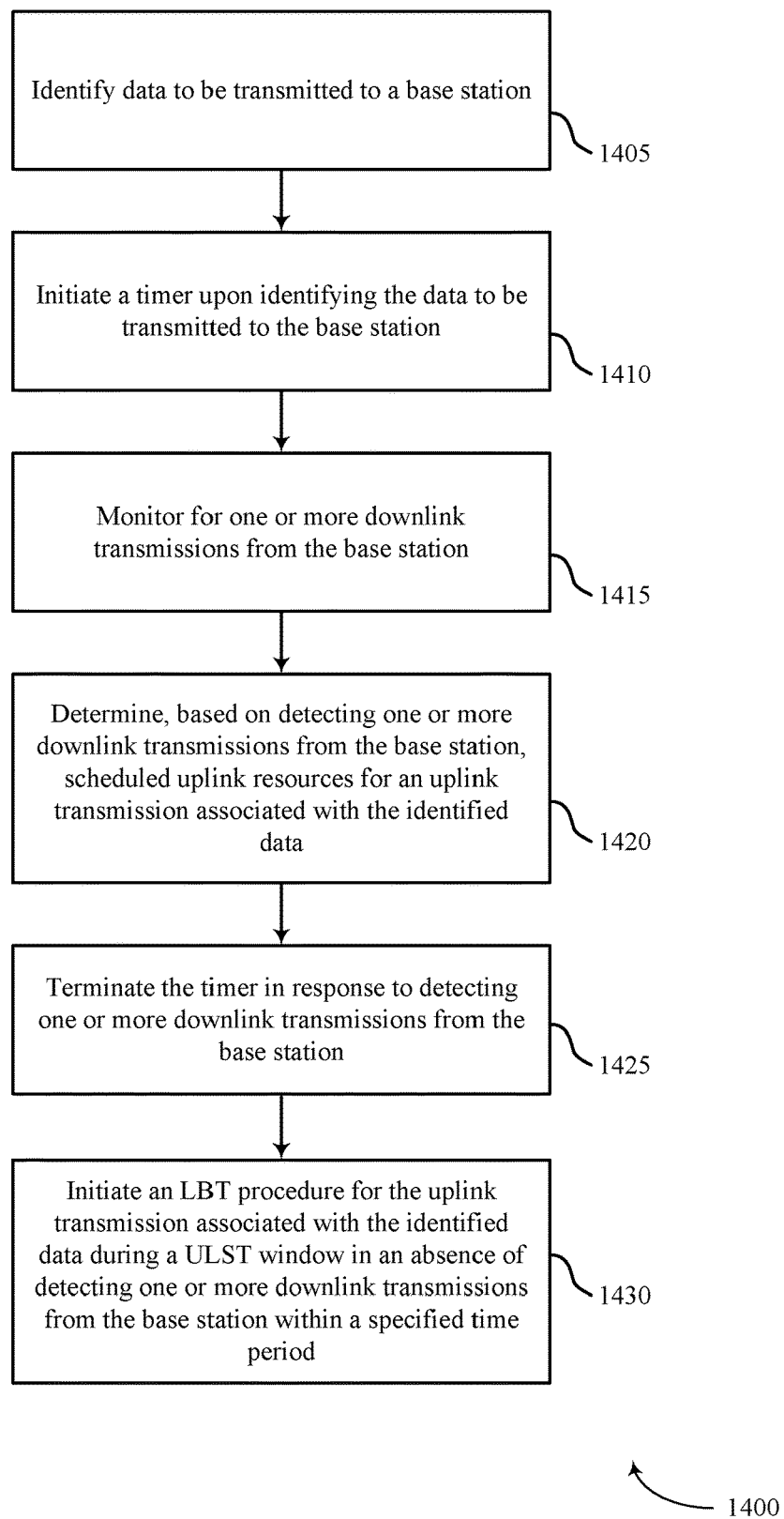

FIG. 14 shows a flowchart illustrating a method 1400 for ULST techniques using a contention-based radio frequency spectrum in accordance with various aspects of the present disclosure. The operations of method 1400 may be implemented by a device such as a UE 115 or its components as described with reference to FIGS. 1, 2, and 4. For example, the operations of method 1400 may be performed by the ULST manager as described herein. In some examples, the UE 115 may execute a set of codes to control the functional elements of the device to perform the functions described below. Additionally or alternatively, the UE 115 may perform aspects of the functions described below using special-purpose hardware.

At block 1405, the UE 115 may identify data to be transmitted to a base station as described above with reference to FIGS. 2-4. In certain examples, the operations of block 1405 may be performed by the data identifying component as described with reference to FIGS. 6 and 7.

At block 1410, the UE 115 may initiate a timer upon identifying the data to be transmitted to the base station as described above with reference to FIGS. 2-4. In certain examples, the operations of block 1410 may be performed by the timing component as described with reference to FIGS. 6 and 7.

At block 1415, the UE 115 may monitor for one or more downlink transmissions from the base station as described above with reference to FIGS. 2-4. In certain examples, the operations of block 1415 may be performed by the downlink monitoring component as described with reference to FIGS. 6 and 7.

At block 1420, the UE 115 may determine, based on detecting one or more downlink transmissions from the base station, scheduled uplink resources for an uplink transmission associated with the identified data as described above with reference to FIGS. 2-4. In certain examples, the operations of block 1420 may be performed by the uplink resource component as described with reference to FIGS. 6 and 7.

At block 1425, the UE 115 may terminate the timer in response to detecting one or more downlink transmissions from the base station as described above with reference to FIGS. 2-4. In certain examples, the operations of block 1425 may be performed by the timing component as described with reference to FIGS. 6 and 7.

At block 1430, the UE 115 may initiate an LBT procedure for the uplink transmission associated with the identified data during a ULST window in an absence of detecting one or more downlink transmissions from the base station within a specified time period as described above with reference to FIGS. 2-4. In certain examples, the operations of block 1430 may be performed by the LBT component as described with reference to FIGS. 6 and 7.

Figure 15:
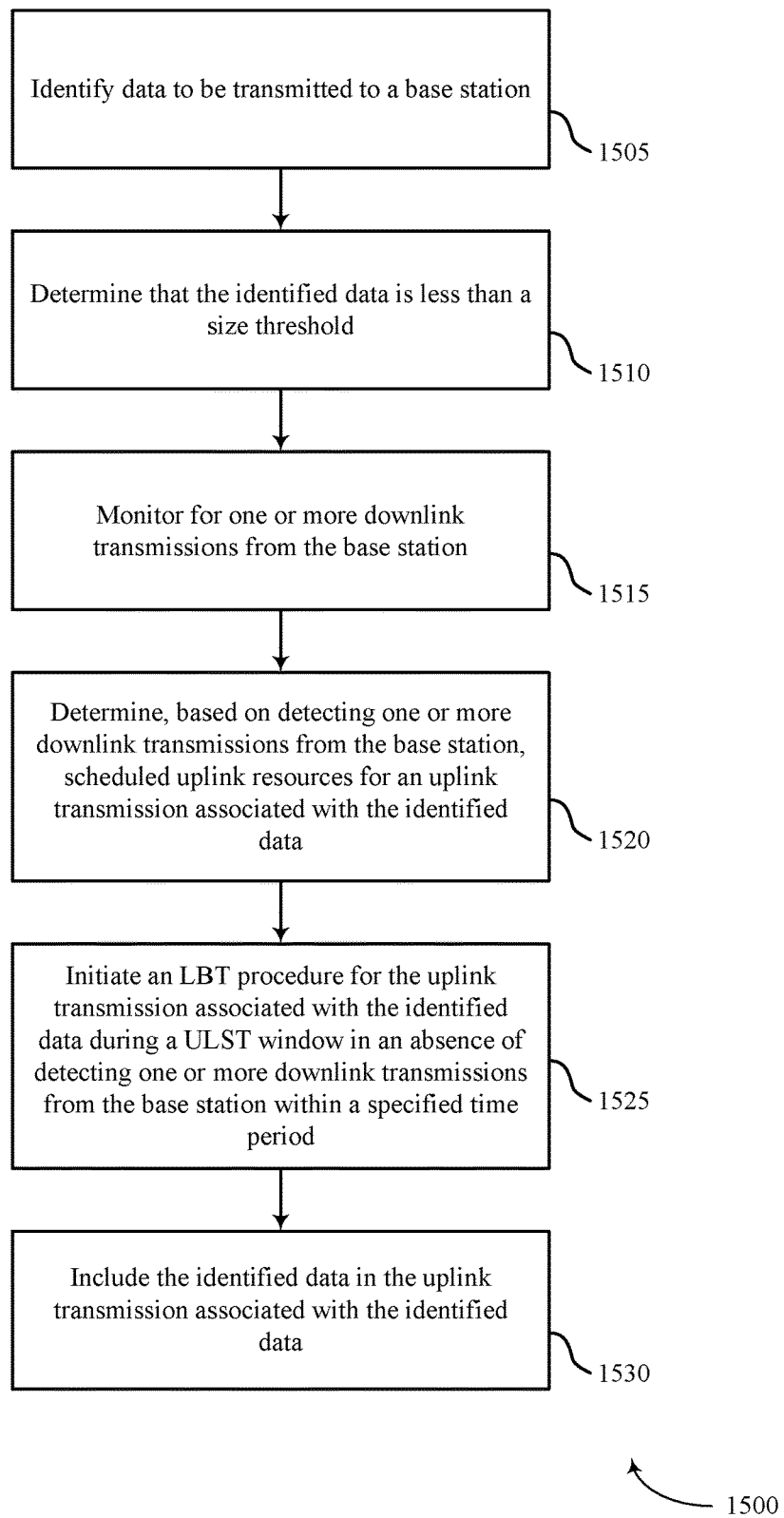

FIG. 15 shows a flowchart illustrating a method 1500 for ULST techniques using a contention-based radio frequency spectrum in accordance with various aspects of the present disclosure. The operations of method 1500 may be implemented by a device such as a UE 115 or its components as described with reference to FIGS. 1, 2, and 4. For example, the operations of method 1500 may be performed by the ULST manager as described herein. In some examples, the UE 115 may execute a set of codes to control the functional elements of the device to perform the functions described below. Additionally or alternatively, the UE 115 may perform aspects of the functions described below using special-purpose hardware.

At block 1505, the UE 115 may identify data to be transmitted to a base station as described above with reference to FIGS. 2-4. In certain examples, the operations of block 1505 may be performed by the data identifying component as described with reference to FIGS. 6 and 7.

At block 1510, the UE 115 may determine that the identified data is less than a size threshold as described above with reference to FIGS. 2-4. In certain examples, the operations of block 1510 may be performed by the data size component as described with reference to FIGS. 6 and 7.

At block 1515, the UE 115 may monitor for one or more downlink transmissions from the base station as described above with reference to FIGS. 2-4. In certain examples, the operations of block 1515 may be performed by the downlink monitoring component as described with reference to FIGS. 6 and 7.

At block 1520, the UE 115 may determine, based on detecting one or more downlink transmissions from the base station, scheduled uplink resources for an uplink transmission associated with the identified data as described above with reference to FIGS. 2-4. In certain examples, the operations of block 1520 may be performed by the uplink resource component as described with reference to FIGS. 6 and 7.

At block 1525, the UE 115 may initiate an LBT procedure for the uplink transmission associated with the identified data during a ULST window in an absence of detecting one or more downlink transmissions from the base station within a specified time period as described above with reference to FIGS. 2-4. In certain examples, the operations of block 1525 may be performed by the LBT component as described with reference to FIGS. 6 and 7.

At block 1530, the UE 115 may include the identified data in the uplink transmission associated with the identified data as described above with reference to FIGS. 2-4. In certain examples, the operations of block 1530 may be performed by the uplink transmission generating component as described with reference to FIGS. 6 and 7.

Figure 16:
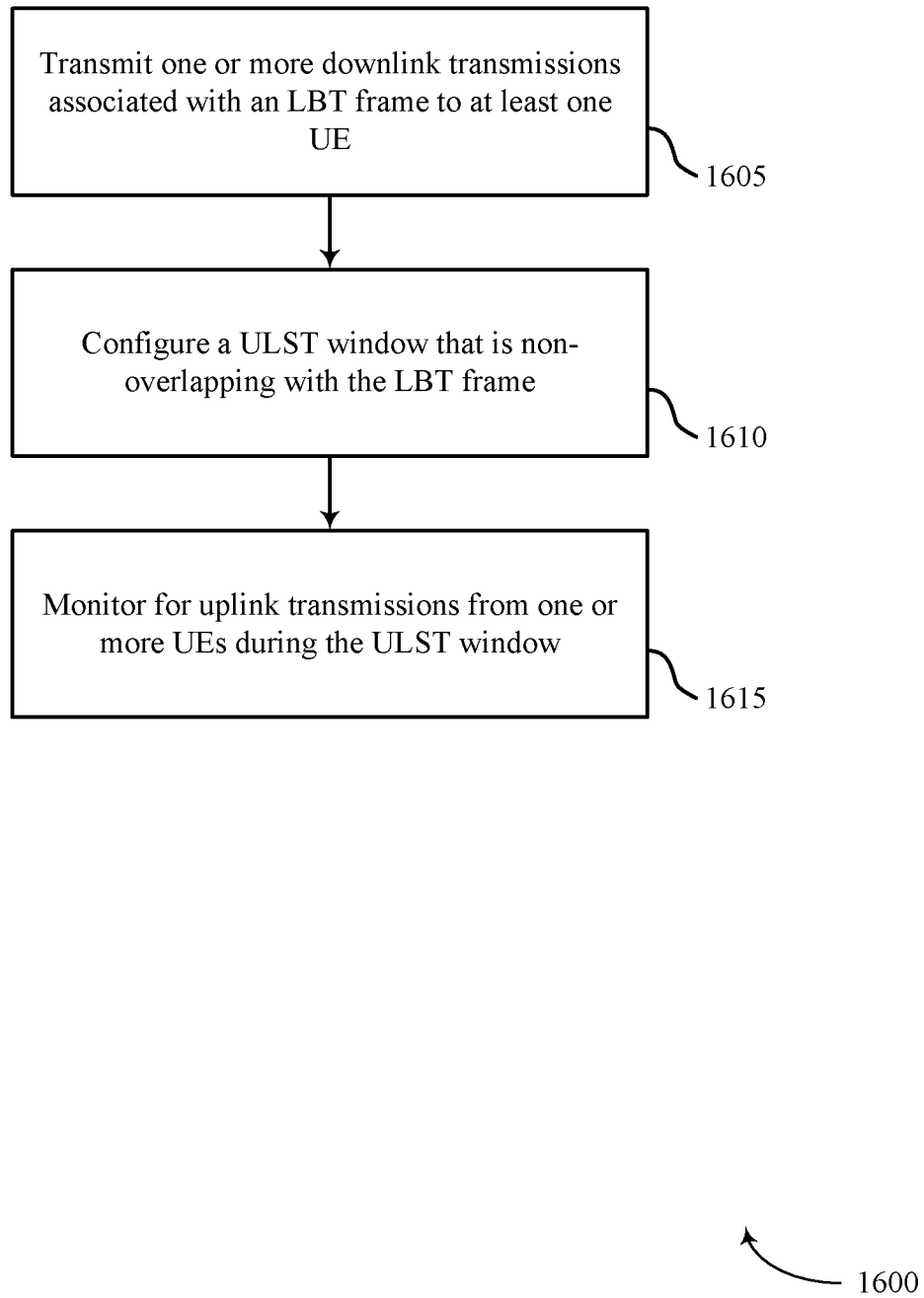

FIG. 16 shows a flowchart illustrating a method 1600 for ULST techniques using a contention-based radio frequency spectrum in accordance with various aspects of the present disclosure. The operations of method 1600 may be implemented by a device such as a base station 105 or its components as described with reference to FIGS. 1, 2, and 4. For example, the operations of method 1600 may be performed by the base station ULST manager as described herein. In some examples, the base station 105 may execute a set of codes to control the functional elements of the device to perform the functions described below. Additionally or alternatively, the base station 105 may perform aspects of the functions described below using special-purpose hardware.

At block 1605, the base station 105 may transmit one or more downlink transmissions associated with an LBT frame to at least one UE as described above with reference to FIGS. 2-4. In certain examples, the operations of block 1605 may be performed by the downlink transmission component as described with reference to FIGS. 10 and 11.

At block 1610, the base station 105 may configure a ULST window that is non-overlapping with the LBT frame as described above with reference to FIGS. 2-4. In certain examples, the operations of block 1610 may be performed by the ULST window component as described with reference to FIGS. 10 and 11.

At block 1615, the base station 105 may monitor for uplink transmissions from one or more UEs during the ULST window as described above with reference to FIGS. 2-4.

In certain examples, the operations of block 1615 may be performed by the uplink monitoring component as described with reference to FIGS. 10 and 11.

Figure 17:
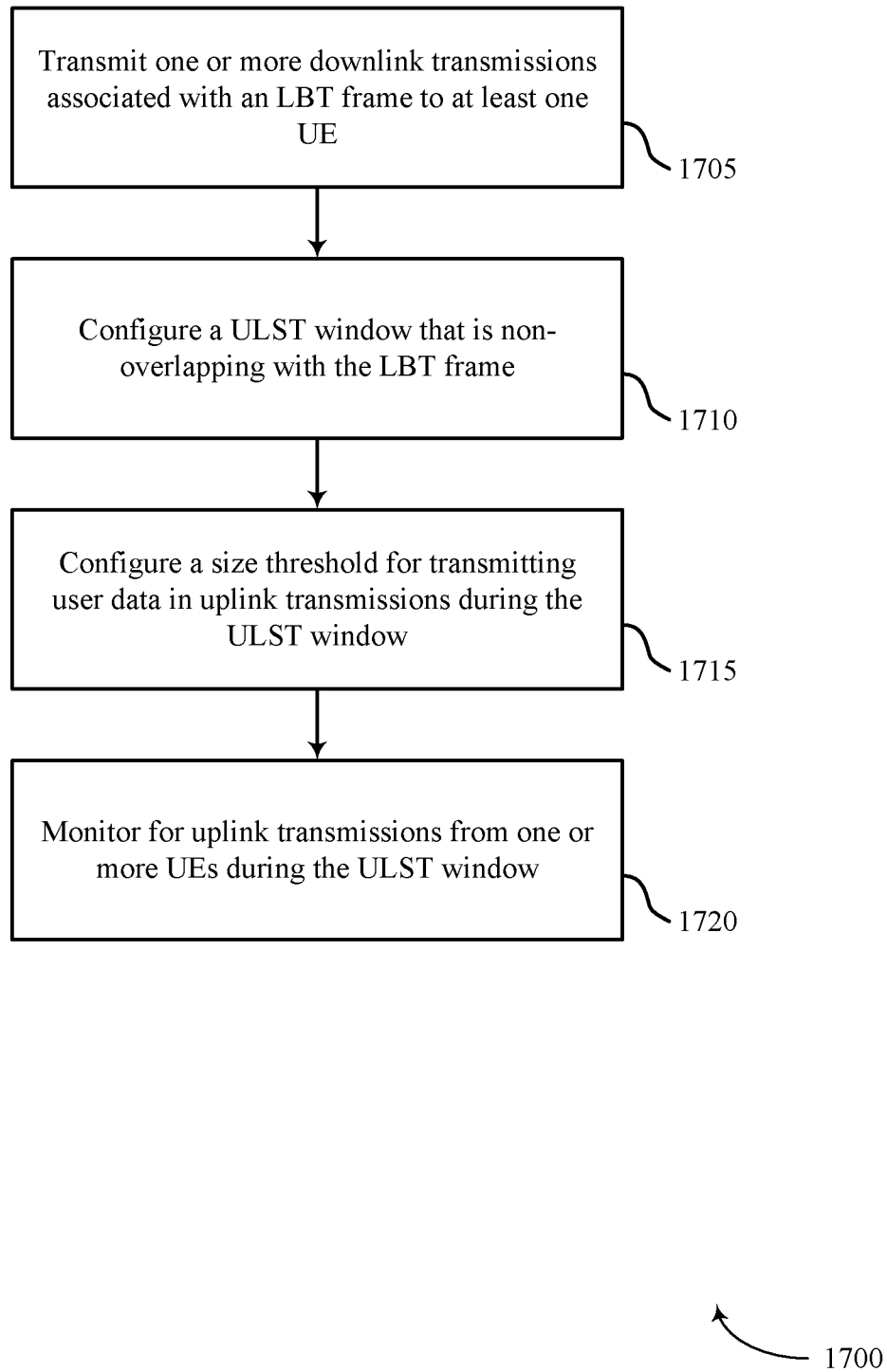

FIG. 17 shows a flowchart illustrating a method 1700 for ULST techniques using a contention-based radio frequency spectrum in accordance with various aspects of the present disclosure. The operations of method 1700 may be implemented by a device such as a base station 105 or its components as described with reference to FIGS. 1, 2, and 4. For example, the operations of method 1700 may be performed by the base station ULST manager as described herein. In some examples, the base station 105 may execute a set of codes to control the functional elements of the device to perform the functions described below. Additionally or alternatively, the base station 105 may perform aspects of the functions described below using special-purpose hardware.

At block 1705, the base station 105 may transmit one or more downlink transmissions associated with an LBT frame to at least one UE as described above with reference to FIGS. 2-4. In certain examples, the operations of block 1705 may be performed by the downlink transmission component as described with reference to FIGS. 10 and 11.

At block 1710, the base station 105 may configure a ULST window that is non-overlapping with the LBT frame as described above with reference to FIGS. 2-4. In certain examples, the operations of block 1710 may be performed by the ULST window component as described with reference to FIGS. 10 and 11.

At block 1715, the base station 105 may configure a size threshold for transmitting user data in uplink transmissions during the ULST window as described above with reference to FIGS. 2-4. In certain examples, the operations of block 1715 may be performed by the data size component as described with reference to FIGS. 10 and 11.

At block 1720, the base station 105 may monitor for uplink transmissions from one or more UEs during the ULST window as described above with reference to FIGS. 2-4. In certain examples, the operations of block 1720 may be performed by the uplink monitoring component as described with reference to FIGS. 10 and 11.

It should be noted that these methods describe possible implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for ULST techniques using a contention-based radio frequency spectrum.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of or" "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as code division multiple access (CDMA), time division multiple access (TDMA), FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-A are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for ULST techniques using a contention-based radio frequency spectrum. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

What is claimed is:

1. A method of wireless communication at a user equipment (UE), comprising:
    identifying data to be transmitted to a base station;
    initiating a timer based at least in part on identifying the data;
    monitoring for one or more downlink transmissions from the base station, the one or more downlink transmissions indicating scheduled uplink resources allocated for uplink short transmissions (ULSTs);
    performing a ULST associated with the identified data using the scheduled uplink resources upon detection of the one or more downlink transmissions from the base station before expiration of the timer; and
    initiating, after expiration of the timer and in an absence of the one or more downlink transmissions being detected before expiration of the timer, a listen-before talk (LBT) procedure during a ULST window.

2. The method of claim 1, further comprising:
    initiating the timer after identifying the data to be transmitted to the base station; and
    terminating the timer in response to detection of the one or more downlink transmissions from the base station.

3. The method of claim 1, wherein the monitoring for the one or more downlink transmissions comprises:
    monitoring for a downlink preamble associated with an LBT frame.

4. The method of claim 3, wherein the scheduled uplink resources are determined based at least in part on the downlink preamble.

5. The method of claim 3, wherein the scheduled uplink resources comprise resources of an uplink subframe associated with the LBT frame.

6. The method of claim 5, wherein the scheduled uplink resources comprise one or more of semi-statically configured uplink resources of one or more uplink subframes of the LBT frame, predefined uplink resources of a first uplink subframe of the LBT frame, or dynamically configured resources identified in the downlink preamble.

7. The method of claim 1, wherein initiating the LBT procedure further comprises:
    identifying resources within the ULST window for performing the ULST associated with the identified data.

8. The method of claim 7, wherein the identified resources within the ULST window for performing the ULST associated with the identified data are semi-statically configured resources.

9. The method of claim 7, wherein the identified resources within the ULST window for performing the ULST associated with the identified data are received in a system information block (SIB) from the base station.

10. The method of claim 1, wherein the LBT procedure is initiated outside of an LBT frame.

11. The method of claim 1, wherein the ULST associated with the identified data comprises a scheduling request (SR) or a random access request to schedule uplink resources for uplink transmission of the identified data.

12. The method of claim 1, further comprising:
    determining that the identified data is less than a size threshold; and
    including the identified data in the ULST.

13. A method of wireless communication comprising:
    transmitting one or more downlink transmissions associated with a listen-before-talk (LBT) frame to one or more user equipment (UE), the one or more downlink transmissions indicating scheduled uplink resources allocated for uplink short transmissions (ULSTs);
    configuring a ULST window that is at least partially non-overlapping with the LBT frame;
    configuring the one or more UEs with a timer for monitoring for the one or more downlink transmissions; and
    configuring the one or more UEs to initiate an LBT procedure during the ULST window in an absence of detecting the one or more downlink transmissions prior to expiration of the timer; and
    monitoring for a ULST from the one or more UEs during the ULST window.

14. The method of claim 13, further comprising:
    scheduling uplink resources in one or more uplink subframes of the LBT frame; and
    configuring the one or more UEs to transmit the ULST during the scheduled uplink resources upon detecting the one or more downlink transmissions prior to expiration of the timer.

15. The method of claim 14, wherein the one or more downlink transmissions comprise a downlink preamble, and wherein the scheduled uplink resources are determined based at least in part on the downlink preamble.

16. The method of claim 14, wherein the scheduled uplink resources comprise resources of an uplink subframe associated with the LBT frame.

17. The method of claim 16, wherein the scheduled uplink resources comprise one or more of semi-statically configured uplink resources of one or more uplink subframes of the LBT frame, predefined uplink resources of a first uplink subframe of the LBT frame, or dynamically configured resources identified in a downlink preamble.

18. The method of claim 13, wherein configuring the ULST window comprises:
    configuring resources within the ULST window for uplink transmissions.

19. The method of claim 18, wherein the configured resources within the ULST window configured for uplink transmissions are semi-statically configured resources.

20. The method of claim 18, wherein configuring the ULST window further comprises:
    transmitting a system information block (SIB) to the one or more UEs with the ULST window and the configured resources within the ULST window configured for uplink transmissions.

21. The method of claim 13, wherein the ULST comprises one or more of a scheduling request (SR) or a random access request to schedule uplink resources for one or more subsequent uplink transmissions.

22. The method of claim 13, further comprising:
configuring a size threshold for transmitting user data in the ULST during the ULST window.

23. An apparatus for wireless communication, comprising:
a processor;
memory in communication with the processor; and
instructions stored in the memory and operable, when executed by the processor, to cause the apparatus to:
identify data to be transmitted to a base station;
initiate a timer based at least in part on identifying the data;
monitor for one or more downlink transmissions from the base station, the one or more downlink transmissions indicating scheduled uplink resources allocated for uplink short transmissions (ULSTs);
perform a ULST associated with the identified data using the scheduled uplink resources upon detection of the one or more downlink transmission from the base station before expiration of the timer; and
initiate, after expiration of the timer and in an absence of the one or more downlink transmissions being detected before expiration of the timer, a listen-before talk (LBT) procedure during a ULST window.

24. The apparatus of claim 23, wherein the instructions are operable to cause the processor to:
initiate the timer after identifying the data to be transmitted to the base station; and
terminate the timer in response to detection of the one or more downlink transmissions from the base station.

25. The apparatus of claim 23, wherein the instructions are operable to cause the processor to:
identify resources within the ULST window for performing the ULST associated with the identified data.

26. The apparatus of claim 23, wherein the instructions are operable to cause the processor to:
determine that the identified data is less than a size threshold; and
include the identified data in the ULST.

27. An apparatus for wireless communication, comprising:
a processor;
memory in communication with the processor; and
instructions stored in the memory and operable, when executed by the processor, to cause the apparatus to:
transmit one or more downlink transmissions associated with a listen-before-talk (LBT) frame to one or more user equipment (UE), the one or more downlink transmissions indicating scheduled uplink resources allocated for uplink short transmissions (UL S Ts);
configure a ULST window that is at least partially non-overlapping with the LBT frame;
configure the one or more UEs with a timer for monitoring for the one or more downlink transmissions; and
configure the one or more UEs to initiate an LBT procedure during the ULST window in an absence of detecting the one or more downlink transmissions prior to expiration of the timer; and
monitor for a ULST from the one or more UEs during the ULST window.

28. The apparatus of claim 27, wherein the instructions are operable to cause the processor to:
schedule uplink resources in one or more uplink subframes of the LBT frame; and
configure the one or more UEs to transmit the ULST during the scheduled uplink resources upon detecting the one or more downlink transmissions prior to expiration of the timer.

* * * * *